US008922583B2

(12) United States Patent
Tartz et al.

(10) Patent No.: US 8,922,583 B2
(45) Date of Patent: Dec. 30, 2014

(54) SYSTEM AND METHOD OF CONTROLLING THREE DIMENSIONAL VIRTUAL OBJECTS ON A PORTABLE COMPUTING DEVICE

(75) Inventors: Robert S. Tartz, San Marcos, CA (US); James B. Cary, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 494 days.

(21) Appl. No.: 12/619,930

(22) Filed: Nov. 17, 2009

(65) Prior Publication Data

US 2011/0115784 A1 May 19, 2011

(51) Int. Cl.
*G09G 5/00* (2006.01)
*G06F 3/0481* (2013.01)
*G06F 1/16* (2006.01)
*G06F 3/0346* (2013.01)
*G06F 3/0354* (2013.01)

(52) U.S. Cl.
CPC ...... *G06F 3/0346* (2013.01); *G06F 2203/0339* (2013.01); *G06F 2200/1637* (2013.01); *G06F 3/04815* (2013.01); *G06F 1/1624* (2013.01); *G06F 2200/1636* (2013.01); *G06F 3/03547* (2013.01); *G06F 1/1694* (2013.01); *G06F 1/1643* (2013.01)
USPC .......................................................... 345/619

(58) Field of Classification Search
CPC ........................... G06F 3/03547; G06F 3/0488
USPC ............................................... 345/173, 419
See application file for complete search history.

(56) References Cited

U.S. PATENT DOCUMENTS

| 5,729,249 A | 3/1998 | Yasutake |
| 6,597,347 B1 | 7/2003 | Yasutake |
| 6,940,291 B1* | 9/2005 | Ozick ............................ 324/658 |
| 7,184,025 B2* | 2/2007 | Williams et al. ............... 345/169 |
| RE40,891 E * | 9/2009 | Yasutake ....................... 345/173 |
| 2005/0151642 A1* | 7/2005 | Tupler et al. ............. 340/539.18 |
| 2006/0017692 A1* | 1/2006 | Wehrenberg et al. ......... 345/156 |
| 2009/0256809 A1* | 10/2009 | Minor ........................... 345/173 |

FOREIGN PATENT DOCUMENTS

| CN | 101036106 A | 9/2007 |
| EP | 1400891 A2 | 3/2004 |
| GB | 2336749 A | 10/1999 |
| JP | H0850531 A | 2/1996 |
| JP | 2007525775 A | 9/2007 |
| WO | 0010242 A1 | 2/2000 |
| WO | 03091684 A1 | 11/2003 |
| WO | WO-2005093550 A2 | 10/2005 |
| WO | WO2009127916 A2 | 10/2009 |

OTHER PUBLICATIONS

Terzopoulos et al (Elastically Deformable Models, Jul. 1987).*
International Search Report and Written Opinion—PCT/US2010/056909, International Search Authority—European Patent Office—Feb. 9, 2011.
Taiwan Search Report—TW099139546—TIPO—Jul. 11, 2013.

* cited by examiner

Primary Examiner — Maurice L McDowell, Jr.
Assistant Examiner — Kyle Zhai
(74) Attorney, Agent, or Firm — Jeffrey D. Jacobs

(57) ABSTRACT

A method of manipulating a three-dimensional (3D) virtual objects at a wireless device is disclosed and includes detecting a press on a 3D sensor array and moving the 3D virtual object in response to the press. Further, the method includes detecting a release of the press on the 3D sensor array and stopping the 3D virtual object.

28 Claims, 19 Drawing Sheets

US 8,922,583 B2

SYSTEM AND METHOD OF CONTROLLING THREE DIMENSIONAL VIRTUAL OBJECTS ON A PORTABLE COMPUTING DEVICE

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. Many portable computing devices include a touch screen interface in which a user may interact with the device and input commands. Further, the touch screen interface may be used to display multiple items, e.g., application icons, thumbnails, tiles, or a combination thereof.

Some of the items displayed may be three dimensional (3D) virtual objects. Depending on the application it may be advantageous to move a 3D virtual object around within the display.

Accordingly, what is needed is an improved system and method of controlling 3D virtual objects at a portable computing device.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the term is "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
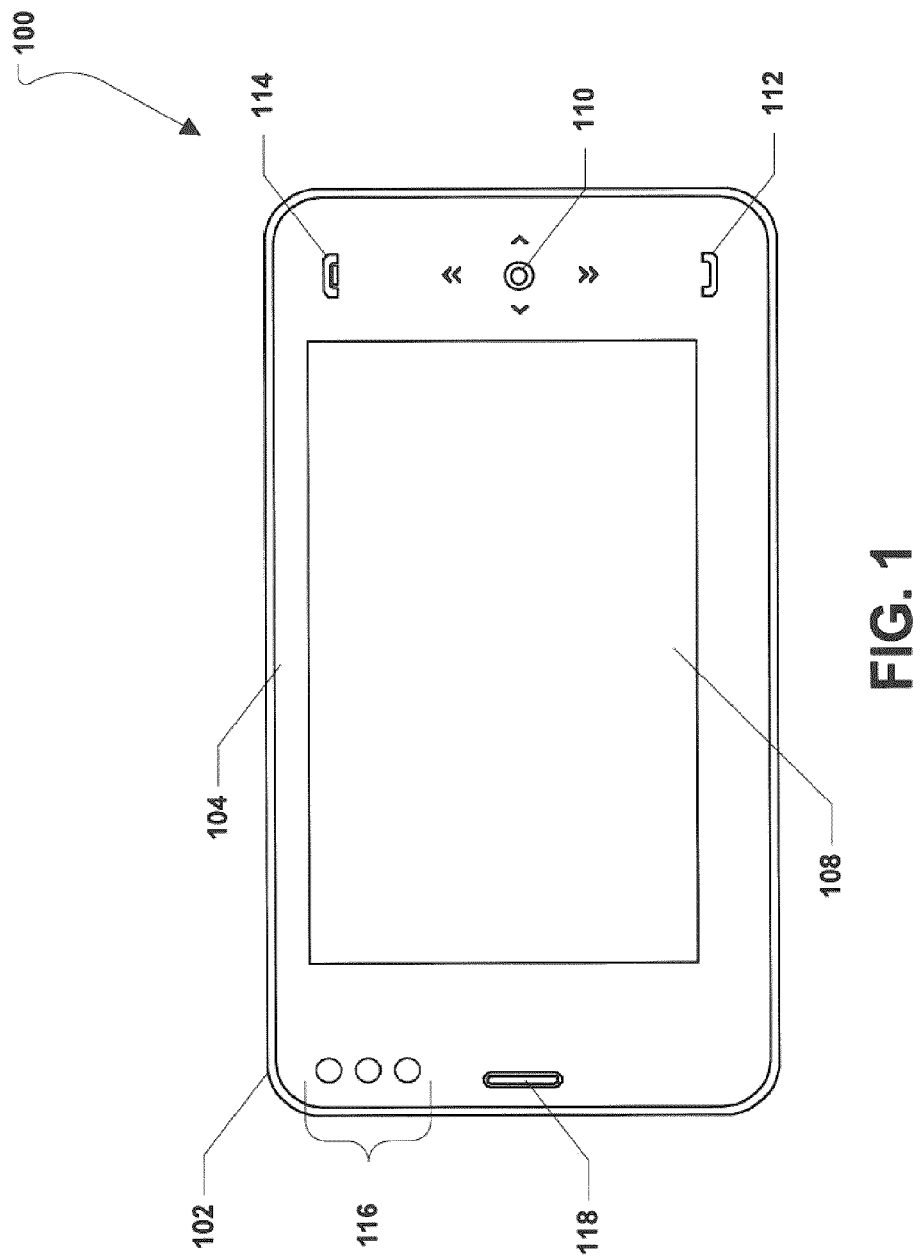
FIG. 1 is a front plan view of a first aspect of a portable computing device (PCD) in a closed position.
Figure 2:
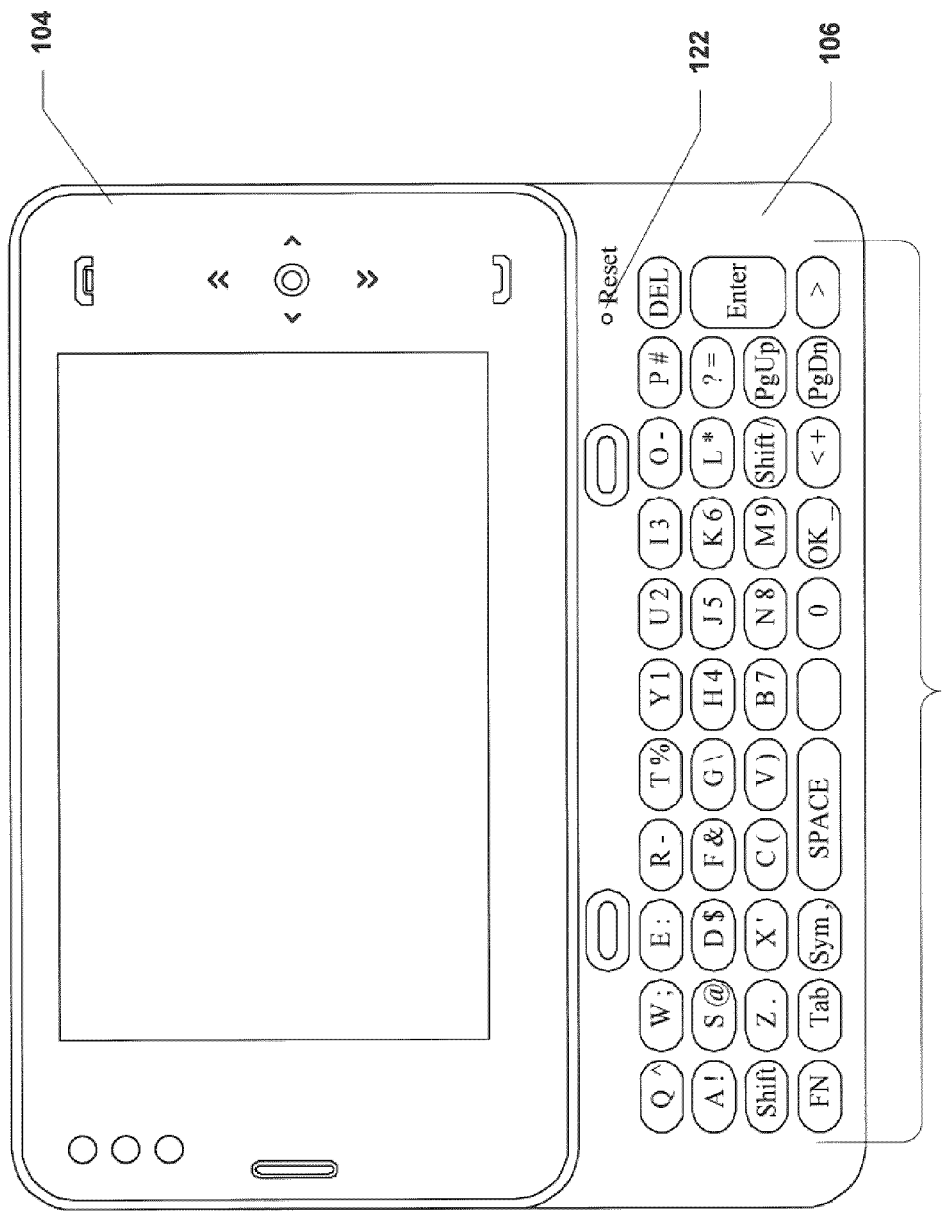
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
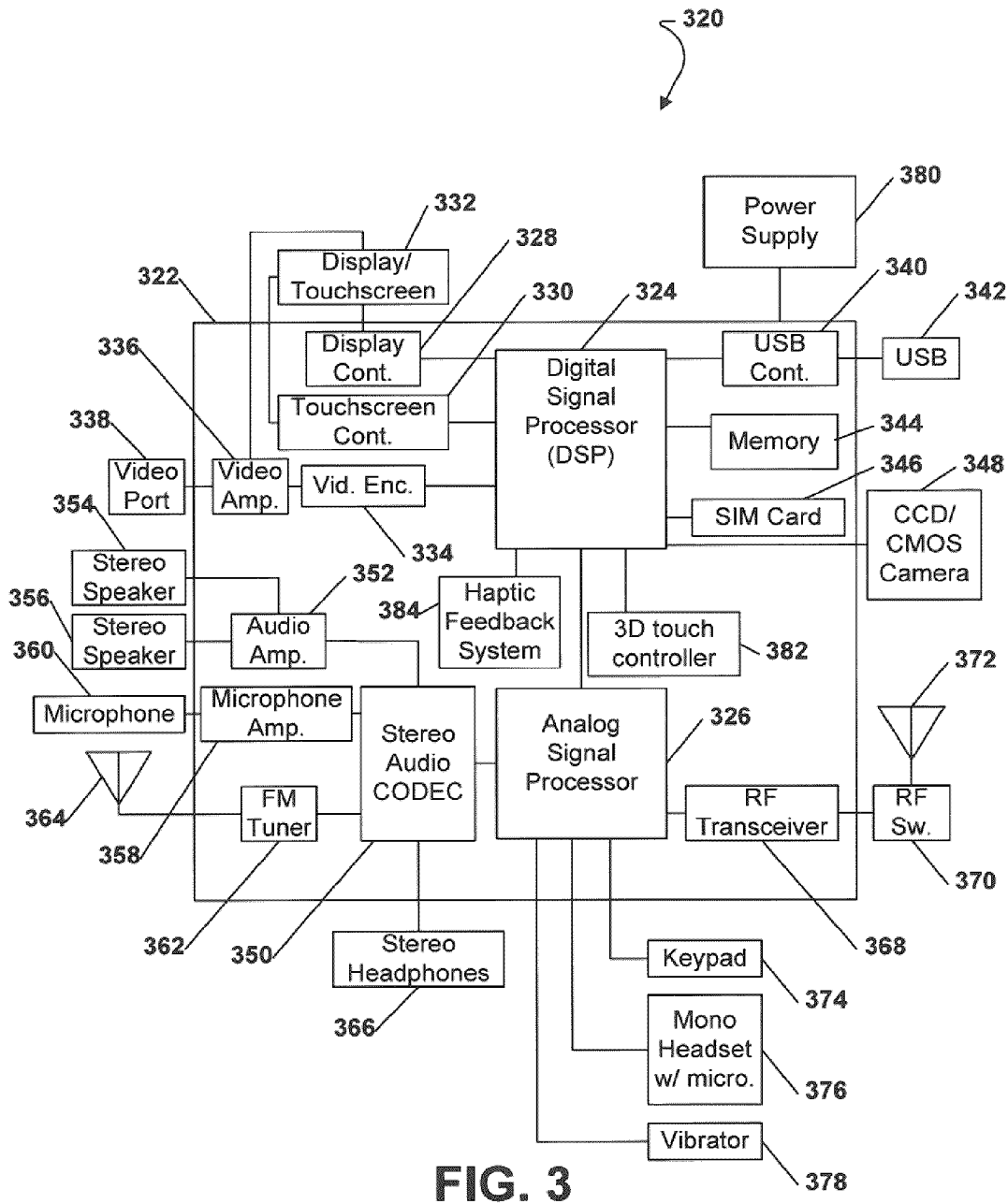
FIG. 3 is a block diagram of the first aspect of a PCD.

Referring to FIG. 3, an exemplary, non-limiting aspect of a portable computing device (PCD) is shown and is generally designated 320. As shown, the PCD 320 includes an on-chip system 322 that includes a digital signal processor 324 and an analog signal processor 326 that are coupled together. The on-chip system 322 may include more than two processors. For example, the on-chip system 322 may include four core processors and an ARM 11 processor, i.e., as described below in conjunction with FIG. 32.

As illustrated in FIG. 3, a display controller 328 and a touch screen controller 330 are coupled to the digital signal processor 324. In turn, a touch screen display 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the digital signal processor 324. Further, a video amplifier 336 is coupled to the video encoder 334 and the touch screen display 332. Also, a video port 338 is coupled to the video amplifier 336. As depicted in FIG. 3, a universal serial bus (USB) controller 340 is coupled to the digital signal processor 324. Also, a USB port 342 is coupled to the USB controller 340. A memory 344 and a subscriber identity module (SIM) card 346 may also be coupled to the digital signal processor 324. Further, as shown in FIG. 3, a digital camera 348 may be coupled to the digital signal processor 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the analog signal processor 326. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the analog signal processor 326. An RF switch 370 may be coupled to the RF transceiver 368 and an RF antenna 372. As shown in FIG. 3, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 indicates that the PCD 320 may include a 3D touch controller 382. The 3D touch controller 382 may be a stand-alone controller or it may be a software controller within the memory 344. Further, the 3D touch controller 382, alone or in conjunction with the processors 324, 326, may serve as a means for executing one or more of the method steps described herein.

FIG. 3 further indicates that the PCD 320 may also include a haptic feedback system 384. The haptic feedback system 384 may be used to provide haptic feedback to a user as the user controls the movement of a 3D virtual object. Various sensors, described herein, may include haptic output devices incorporated therein and the haptic output devices may be used to render touch feedback to a user as a user grabs a 3D virtual object. The haptic output devices may include piezo-electric actuators, vibrotactile actuators, or a combination thereof. For example, the haptic output devices could produce touch sensations on a users thumb and forefinger that simulate the texture or features of a 3D virtual object in various positions.

As depicted in FIG. 3, the touch screen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by a processor 324, 326 in order to perform the methods described herein. Further, the processors 324, 326, the memory 344, the 3D touch controller 382, the display controller 328, the touch screen controller 330, or a combination thereof may serve as a means for executing one or more of the method steps described herein in order to control a virtual keyboard displayed at the display/touch screen 332.

Figure 4:
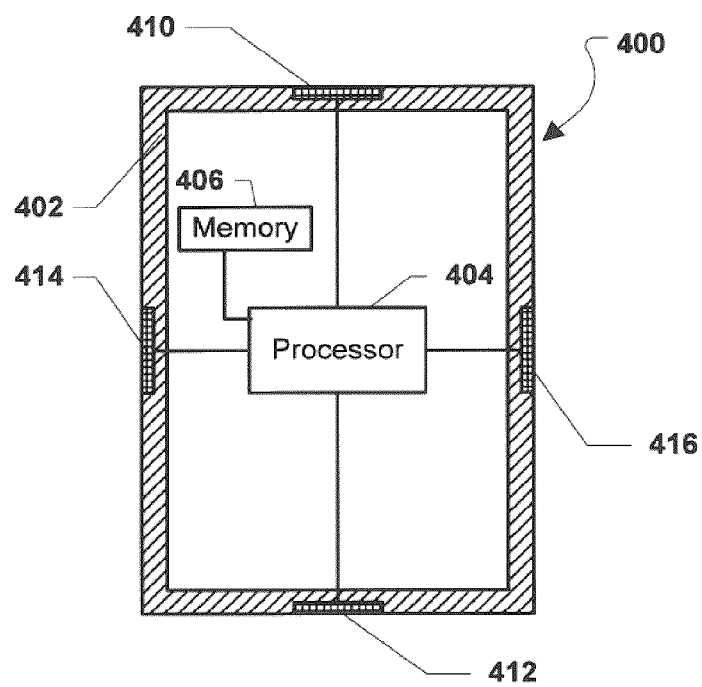
FIG. 4 is a cross-section view of a second aspect of a PCD.
Figure 5:
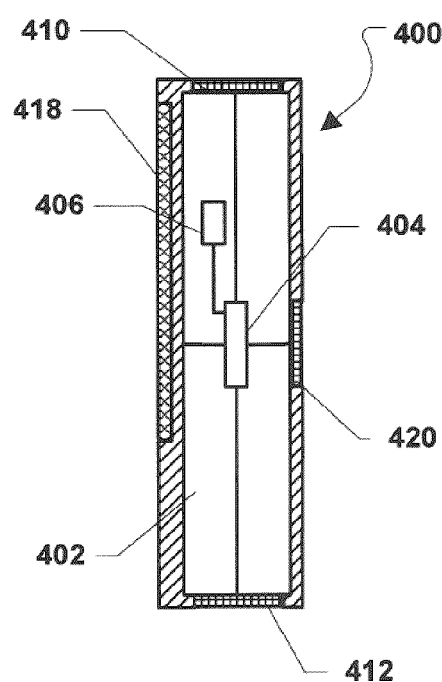
FIG. 5 is another cross-section view of the second aspect of a PCD.

FIG. 4 and FIG. 5 illustrate another aspect of a PCD, generally designated 400. FIG. 4 and FIG. 5 show the PCD 400 in cross-section. As shown, the PCD 400 may include a housing 402. In a particular aspect, one or more of the elements shown in conjunction with FIG. 3 may be disposed, or otherwise installed, within the inner housing 402. However, for clarity, only a processor 404 and a memory 406, connected thereto, are shown within the housing 402.

FIG. 4 and FIG. 5 indicate that a top touch/pressure sensor 410 and a bottom touch/pressure sensor 412 may be installed in, or otherwise disposed on, the housing 402. Moreover, a left touch/pressure sensor 414 and a right touch/pressure sensor 416 may be installed in, or otherwise disposed on, the housing 402. FIG. 5 further illustrates that the PCD 400 may include a front touch/pressure sensor 418 and a back touch/pressure sensor 420 may be installed in, or otherwise disposed on, the housing 402. In a particular embodiment, the front touch/pressure sensor 418 may be a touch sensitive display. The touch/pressure sensors 410, 412, 414, 416, 418, 420 may serve as a 3D sensor array. Further, as 3D virtual objects are displayed, the 3D sensor array may be activated and may provide active control of a 3D virtual object in accordance with one or more of the methods described herein. The 3D sensor array, in conjunction with the 3D touch controller (or another controller/processor) may serve as a means for detecting a press, a touch, a release, a squeeze, a slide, a flick, a bump, etc., on the PCD 400.

Figure 6:
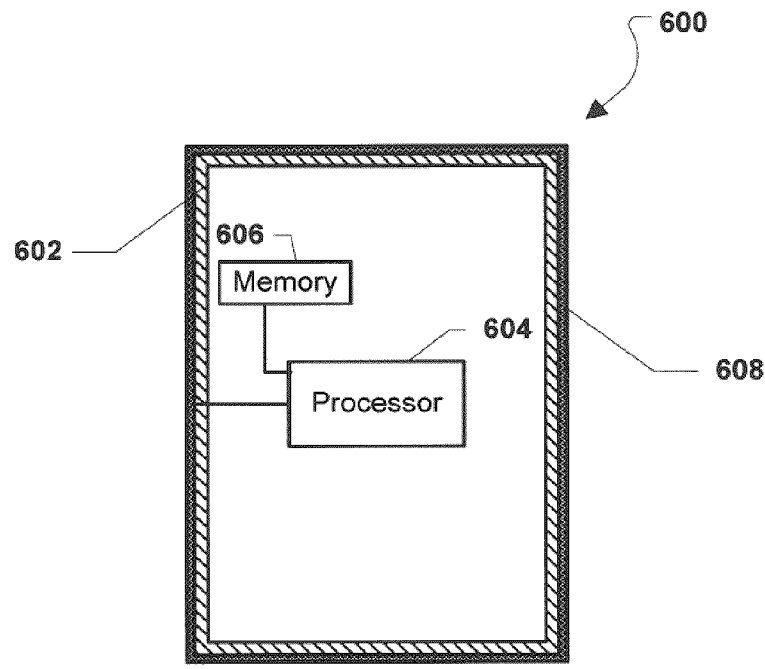
FIG. 6 is a cross-section view of a third aspect of a PCD.

FIG. 6 illustrates yet another aspect of a PCD, generally designated 600. FIG. 6 shows the PCD 600 in cross-section. As shown, the PCD 600 may include a housing 602. In a particular aspect, one or more of the elements shown in conjunction with FIG. 3 may be disposed, or otherwise installed, within the inner housing 602. However, for clarity, only a processor 604 and a memory 606, connected thereto, are shown within the housing 602.

Additionally, the PCD 600 may include a pressure sensitive layer 608 disposed on the outer surface of the housing 602. In a particular embodiment, the pressure sensitive layer 608 may include a piezoelectric material deposited or otherwise disposed on the housing 602. The pressure sensitive layer 608 may serve as a 3D sensor array and may be used to detect touches on various locations on the PCD. Further, as 3D virtual objects are displayed, the 3D sensor array may be activated and may provide active control of a 3D virtual object in accordance with one or more of the methods described herein. The 3D sensor array, in conjunction with the 3D touch controller (or another controller/processor) may serve as a means for detecting a press, a touch, a release, a squeeze, a slide, a flick, a bump, etc., on the PCD 700.

Figure 7:
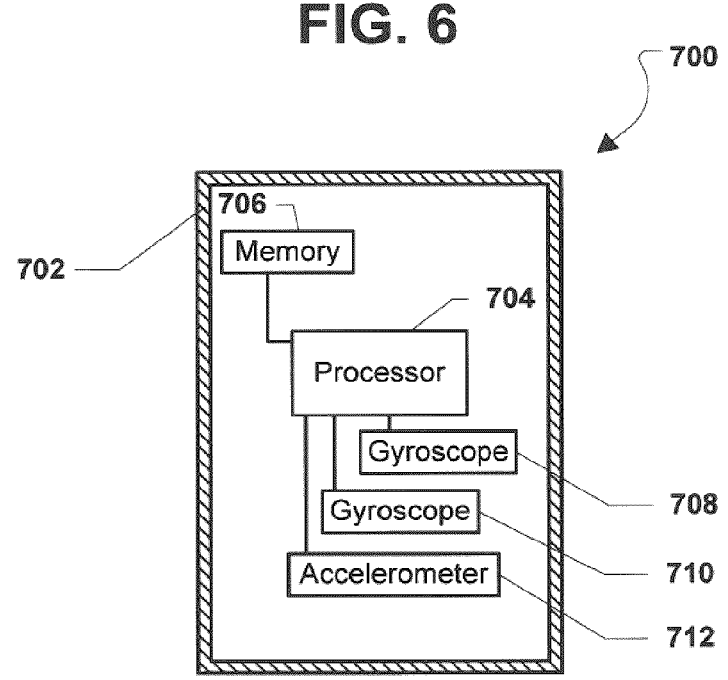
FIG. 7 is a cross-section view of a fourth aspect of a PCD.

FIG. 7 depicts another aspect of a PCD, generally designated 700. FIG. 7 shows the PCD 700 in cross-section. As shown, the PCD 700 may include a housing 702. In a particular aspect, one or more of the elements shown in conjunction with FIG. 3 may be disposed, or otherwise installed, within the inner housing 702. However, for clarity, only a processor 704 and a memory 706, connected thereto, are shown within the housing 702.

Additionally, the PCD 700 may include a first gyroscope 708, a second gyroscope 710, and an accelerometer 712 connected to the processor 704 within the PCD 700. The gyroscopes 708, 710 and the accelerometer 712 may be used to detect when the PCD 700 is bumped and from which direction the PCD 700 is bumped. As 3D virtual objects are displayed, the gyroscope 708, 710 and the accelerometer 712 may provide active control of a 3D virtual object in accordance with one or more of the methods described herein. The gyroscopes 708, 710 and the accelerometer 712, in conjunction with the 3D touch controller (or another controller/processor) may serve as a means for detecting a bump, a shake, another movement, etc., at the PCD 700. Further, the gyroscopes 708, 710 and the accelerometer 712 may detect and determine a force associated with a bump.

Figure 8:
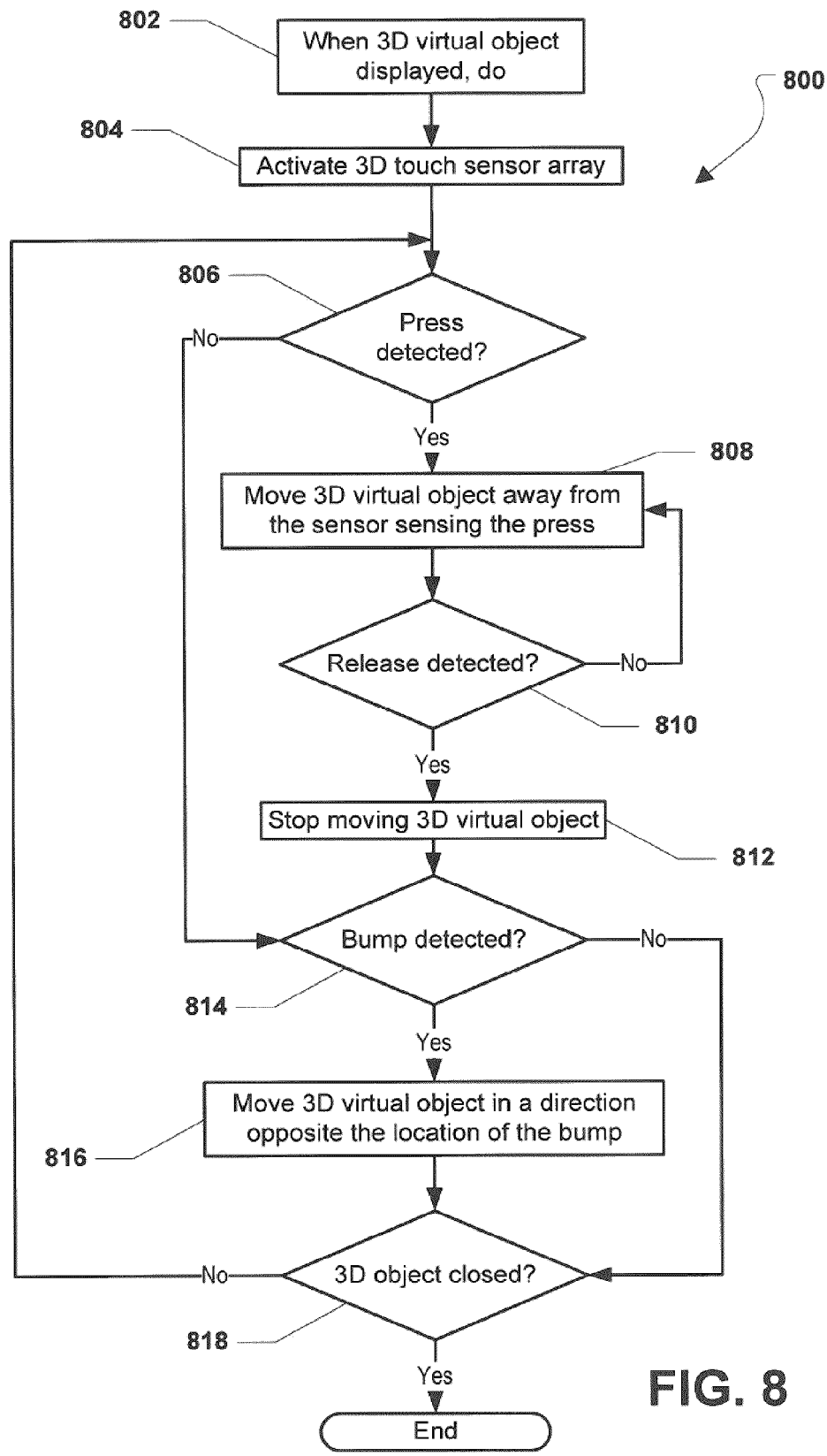
FIG. 8 is a flowchart illustrating a first aspect of a method of controlling 3D virtual objects at a PCD.

Referring to FIG. 8 a first aspect of a method of providing three-dimensional control of 3D virtual objects is shown and is generally designated 800. Commencing at block 802, a do loop may be entered in which when a 3D virtual object is displayed, the following steps may be performed. At block 904, a 3D touch sensor array may be activated, e.g., by a controller, processor, or a combination thereof.

Moving to decision 806, a 3D touch controller may determine whether a press is detected from the back of the 3D touch sensor array. If so, the method 800 may continue to block 808 and the 3D virtual object may be moved away from a sensor that is sensing the press, as if the user is pushing the 3D virtual object. At decision 810, the 3D touch controller may determine whether a release is detected, i.e., the 3D touch controller may determine whether a user is still touching the sensor of the 3D touch sensor array. If a release is not detected, the method 800 may return to block 808 and the 3D virtual object may continue to move in the display. Otherwise, if a release is detected, the 3D virtual object may stop moving in the display at block 812. Thereafter, the method 900 may continue to decision 814.

Returning to decision 806, if a press is not detected, the method 800 may proceed directly to decision 814. At decision 814, the 3D touch controller may determine whether a bump is detected on the 3D touch sensor array. The 3D touch controller may determine whether a bump is detected by using an accelerometer and gyroscope connected thereto. Further, the 3D touch controller may determine a force associated with the bump and a direction of the bump using the accelerometer and the gyroscope. Returning to decision 814, if a bump is detected from the back of the 3D touch sensor array, the method 800 may continue to block 816 and the 3D virtual object may be moved in the display away from the location of the bump at a distance that corresponds to the bump, e.g., corresponding to a force associated with the bump. Thereafter, the method 800 may move to decision 818.

Returning to decision 814, if a bump is not detected from the back of the 3D touch sensor array, the method 800 may move directly to decision 818. At decision 818, the 3D touch controller may determine whether the 3D object is closed, i.e., whether the 3D object is no longer displayed. If not, the method 800 may return to decision 806 and the method 800 may continue as described herein. Otherwise, if the 3D object is closed, the method 800 may end.

Figure 9:
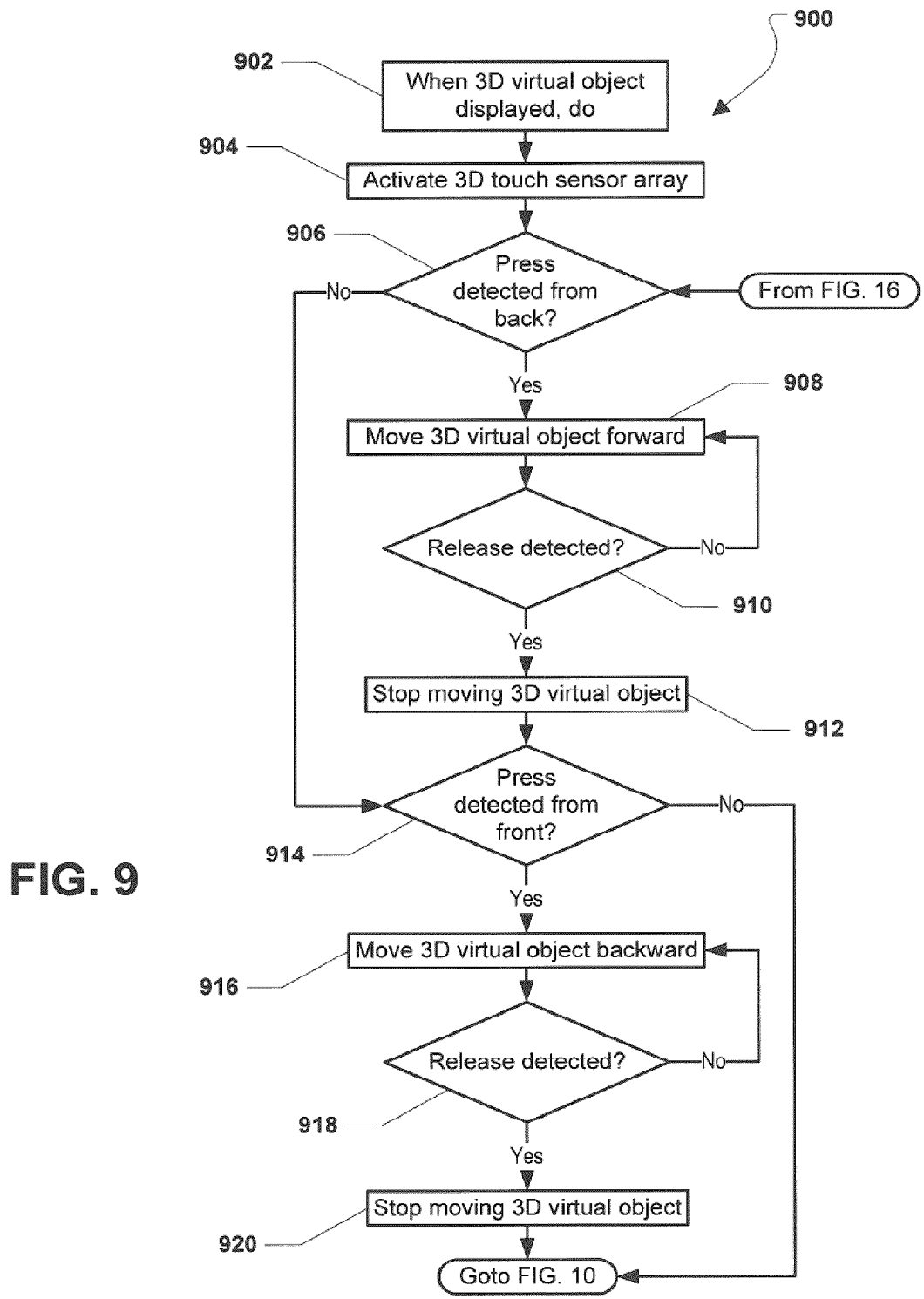
FIG. 9 is a flowchart illustrating a first portion of a second aspect of a method of controlling 3D virtual objects at a PCD.

Referring now to FIG. 9, a second aspect of a method of providing three-dimensional control of 3D virtual objects is shown and is generally designated 900. Beginning at block 902, a do loop may be entered in which when a 3D virtual object is displayed, the following steps may be performed. At block 904, a 3D touch sensor array may be activated, e.g., by a controller, processor, or a combination thereof.

Moving to decision 906, a 3D touch controller may determine whether a press is detected from the back of the 3D touch sensor array. If so, the method 900 may continue to block 908 and the 3D virtual object may be moved forward in the display, as if the user is pushing the 3D virtual object from behind. At decision 910, the 3D touch controller may determine whether a release is detected, i.e., the 3D touch controller may determine whether a user is still touching the back sensor of the 3D touch sensor array. If a release is not detected, the method 900 may return to block 908 and the 3D virtual object may continue to move forward in the display. Otherwise, if a release is detected, the 3D virtual object may stop moving forward in the display at block 912. Thereafter, the method 900 may continue to decision 914.

Returning to decision 906, if a press is not detected from the back, the method 900 may proceed directly to decision 914. At decision 914, a 3D touch controller may determine whether a press is detected from the front of the 3D touch sensor array. If so, the method 900 may continue to block 916 and the 3D virtual object may be moved backward in the display as if the user is pushing the 3D virtual object from the front. At decision 918, the 3D touch controller may determine whether a release is detected, i.e., the 3D touch controller may determine whether a user is still touching the front sensor of the 3D touch sensor array. If a release is not detected, the method 900 may return to block 916 and the 3D virtual object may continue to move backward in the display. Otherwise, if a release is detected, the 3D virtual object may stop moving backward in the display at block 920. Thereafter, the method 900 may continue to decision 1002 of FIG. 10. Returning to decision 914, if a press is not detected from the front, the method 900 may proceed directly to decision 1002 of FIG. 10.

Figure 10:
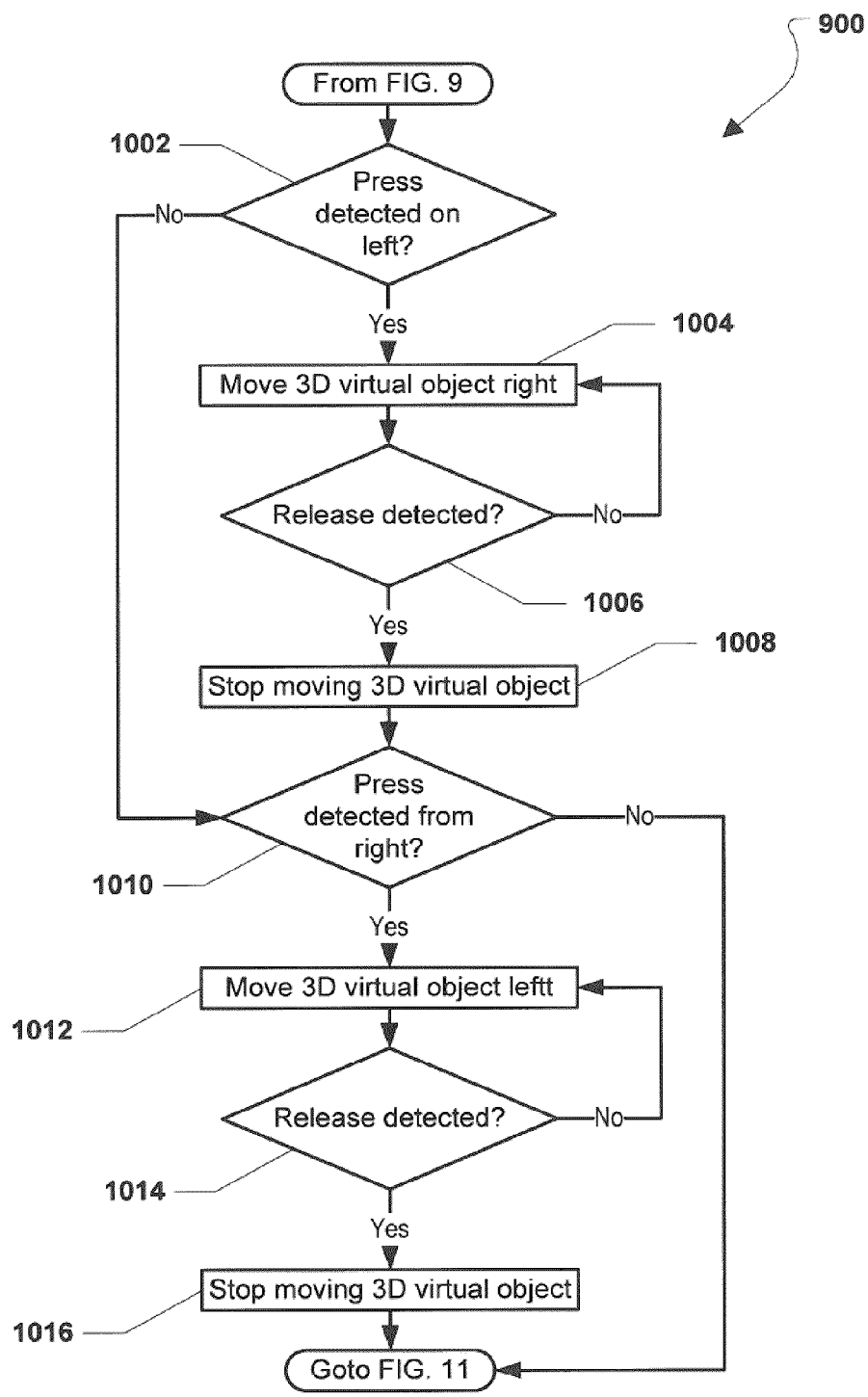
FIG. 10 is a flowchart illustrating a second portion of a second aspect of a method of controlling 3D virtual objects at a PCD.

At decision 1002 of FIG. 10, the 3D touch controller may determine whether a press is detected from the left of the 3D touch sensor array. If so, the method 900 may continue to block 1004 and the 3D virtual object may be moved to the right in the display as if the user is pushing the 3D virtual object from the left. Moving to decision 1006, the 3D touch controller may determine whether a release is detected, i.e., the 3D touch controller may determine whether a user is still touching the left sensor of the 3D touch sensor array. If a release is not detected, the method 900 may return to block 1004 and the 3D virtual object may continue to move to the right in the display. Otherwise, if a release is detected, the 3D virtual object may stop moving to the right in the display at block 1008. Thereafter, the method 900 may continue to decision 1010 of FIG. 10. Returning to decision 1002, if a press is not detected from the left, the method 900 may proceed directly to decision 1010.

At decision 1010 of FIG. 10, the 3D touch controller may determine whether a press is detected from the right of the 3D touch sensor array. If so, the method 900 may continue to block 1012 and the 3D virtual object may be moved to the left in the display as if the user is pushing the 3D virtual object from the right. Moving to decision 1014, the 3D touch controller may determine whether a release is detected, i.e., the 3D touch controller may determine whether a user is still touching the right sensor of the 3D touch sensor array. If a release is not detected, the method 900 may return to block 1012 and the 3D virtual object may continue to move to the left in the display. Otherwise, if a release is detected, the 3D virtual object may stop moving to the left in the display at block 1016. Thereafter, the method 900 may continue to decision 1102 of FIG. 11. Returning to decision 1010, if a press is not detected from the left, the method 900 may proceed directly to decision 1102 of FIG. 11.

Figure 11:
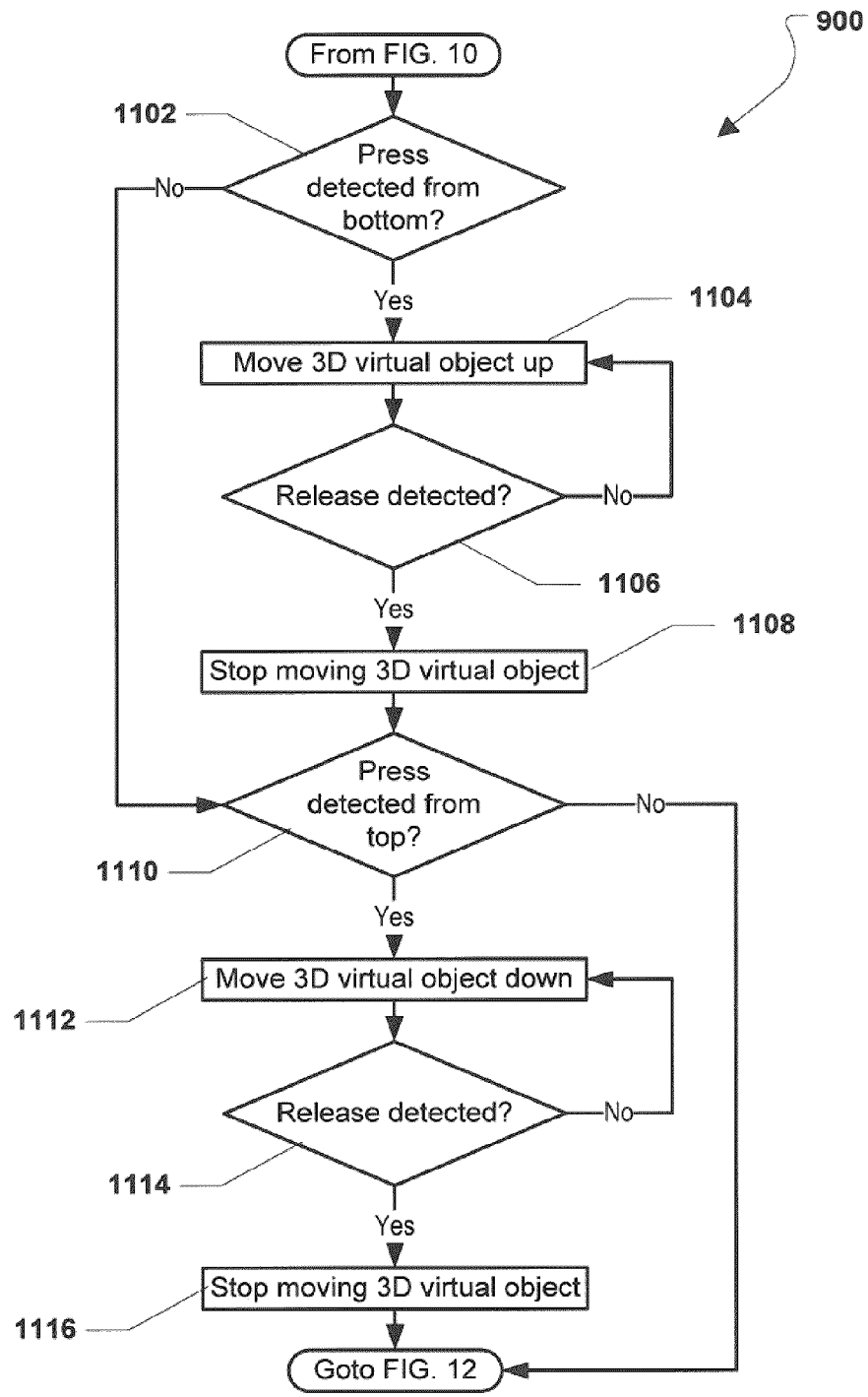
FIG. 11 is a flowchart illustrating a third portion of a second aspect of a method of controlling 3D virtual objects at a PCD.

Moving to decision 1102 of FIG. 11, the 3D touch controller may determine whether a press is detected from the bottom of the 3D touch sensor array. If so, the method 900 may continue to block 1104 and the 3D virtual object may be moved up in the display as if the user is pushing the 3D virtual object from the bottom. Moving to decision 1106, the 3D touch controller may determine whether a release is detected, i.e., the 3D touch controller may determine whether a user is still touching the bottom sensor of the 3D touch sensor array. If a release is not detected, the method 900 may return to block 1104 and the 3D virtual object may continue to move up in the display. Otherwise, if a release is detected, the 3D virtual object may stop moving up in the display at block 1108. Thereafter, the method 900 may continue to decision 1110. Returning to decision 1102, if a press is not detected from the left, the method 900 may proceed directly to decision 1110.

At decision 1110 of FIG. 11, the 3D touch controller may determine whether a press is detected from the top of the 3D touch sensor array. If so, the method 900 may continue to block 1112 and the 3D virtual object may be moved down in the display as if the user is pushing the 3D virtual object from the top. Moving to decision 1114, the 3D touch controller may determine whether a release is detected, i.e., the 3D touch controller may determine whether a user is still touching the top sensor of the 3D touch sensor array. If a release is not detected, the method 900 may return to block 1112 and the 3D virtual object may continue to move down in the display. Otherwise, if a release is detected, the 3D virtual object may stop moving down in the display at block 1116. Thereafter, the method 900 may continue to decision 1202 of FIG. 12. Returning to decision 1110, if a press is not detected from the top, the method 900 may proceed directly to decision 1202 of FIG. 12.

Figure 12:
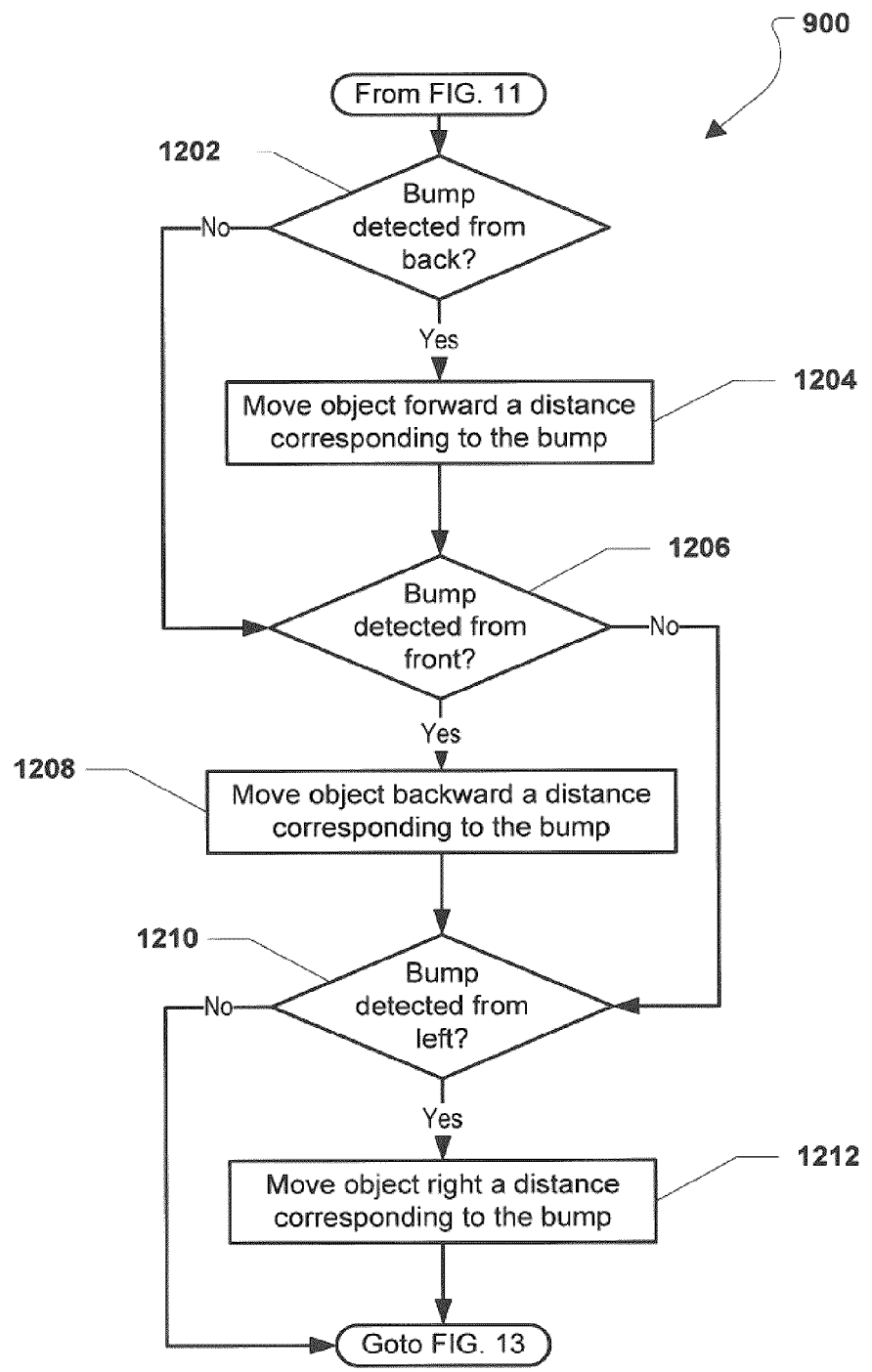
FIG. 12 is a flowchart illustrating a fourth portion of a second aspect of a method of controlling 3D virtual objects at a PCD.

Continuing to decision 1202 of FIG. 12, the 3D touch controller may determine whether a bump is detected from the back of the 3D touch sensor array. The 3D touch controller may determine whether a bump is detected by using an accelerometer and gyroscope connected thereto. Further, the 3D touch controller may determine a force associated with the bump and a direction of the bump using the accelerometer and the gyroscope. Returning to decision 1202, if a bump is detected from the back of the 3D touch sensor array, the method 900 may continue to block 1204 and the 3D virtual object may be moved forward in the display at a distance that corresponds to the bump, e.g., corresponding to a force associated with the bump. Thereafter, the method 900 may move to decision 1206. Returning to decision 1202, if a bump is not detected from the back of the 3D touch sensor array, the method 900 may move directly to decision 1206.

Moving to decision 1206, the 3D touch controller may determine whether a bump is detected from the front of the 3D touch sensor array. If so, the method 900 may move to block 1208 and the 3D virtual object may be moved backward in they display at a distance that corresponds to the bump, e.g., corresponding to a force associated with the bump. Then, the method 900 may move to decision 1210. Returning to decision 1206, if a bump is not detected from the front of the 3D touch sensor array, the method 900 may move directly to decision 1210.

At decision 1210, the 3D touch controller may determine whether a bump is detected from the left of the 3D touch sensor array. If so, the method 900 may move to block 1212 and the 3D virtual object may be moved to the right in the display at a distance that corresponds to the bump, e.g., corresponding to a force associated with the bump. Thereafter, the method 900 may move to decision 1302 of FIG. 13. Returning to decision 1210, if a bump is not detected from the left of the 3D touch sensor array, the method 900 may move directly to decision 1302 of FIG. 13.

Figure 13:
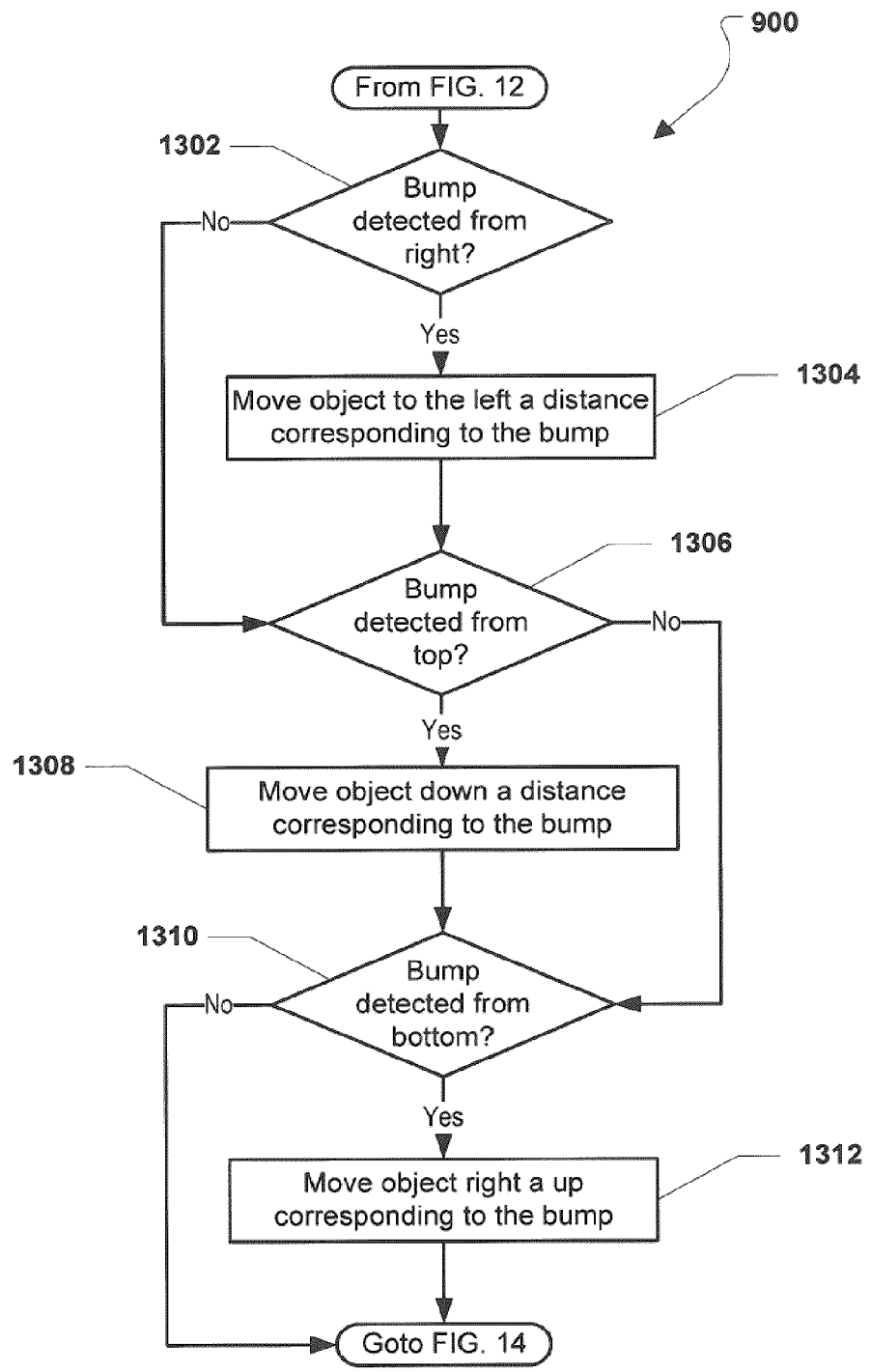
FIG. 13 is a flowchart illustrating a fifth portion of a second aspect of a method of controlling 3D virtual objects at a PCD.

Referring now to FIG. 13, at decision 1302, the 3D touch controller may determine whether a bump is detected from the right of the 3D touch sensor array. If a bump is detected from the right of the 3D touch sensor array, the method 900 may continue to block 1304 and the 3D virtual object may be moved to the left in the display at a distance that corresponds to the bump, e.g., corresponding to a force associated with the bump. Thereafter, the method 900 may move to decision 1306. Returning to decision 1302, if a bump is not detected from the right of the 3D touch sensor array, the method 900 may move directly to decision 1306.

At decision 1306, the 3D touch controller may determine whether a bump is detected from the top of the 3D touch sensor array. If so, the method 900 may move to block 1308 and the 3D virtual object may be moved down in the display at a distance that corresponds to the bump, e.g., corresponding to a force associated with the bump. Next, the method 900 may move to decision 1310. Returning to decision 1306, if a bump is not detected from the top of the 3D touch sensor array, the method 900 may move directly to decision 1310.

Proceeding to decision 1310, the 3D touch controller may determine whether a bump is detected from the bottom of the 3D touch sensor array. If so, the method 900 may move to block 1312 and the 3D virtual object may be moved up in the display at a distance that corresponds to the bump, e.g., corresponding to a force associated with the bump. Then, the method 900 may move to decision 1402 of FIG. 14. Returning to decision 1310, if a bump is not detected from the bottom of the 3D touch sensor array, the method 900 may move directly to decision 1402 of FIG. 14.

Figure 14:
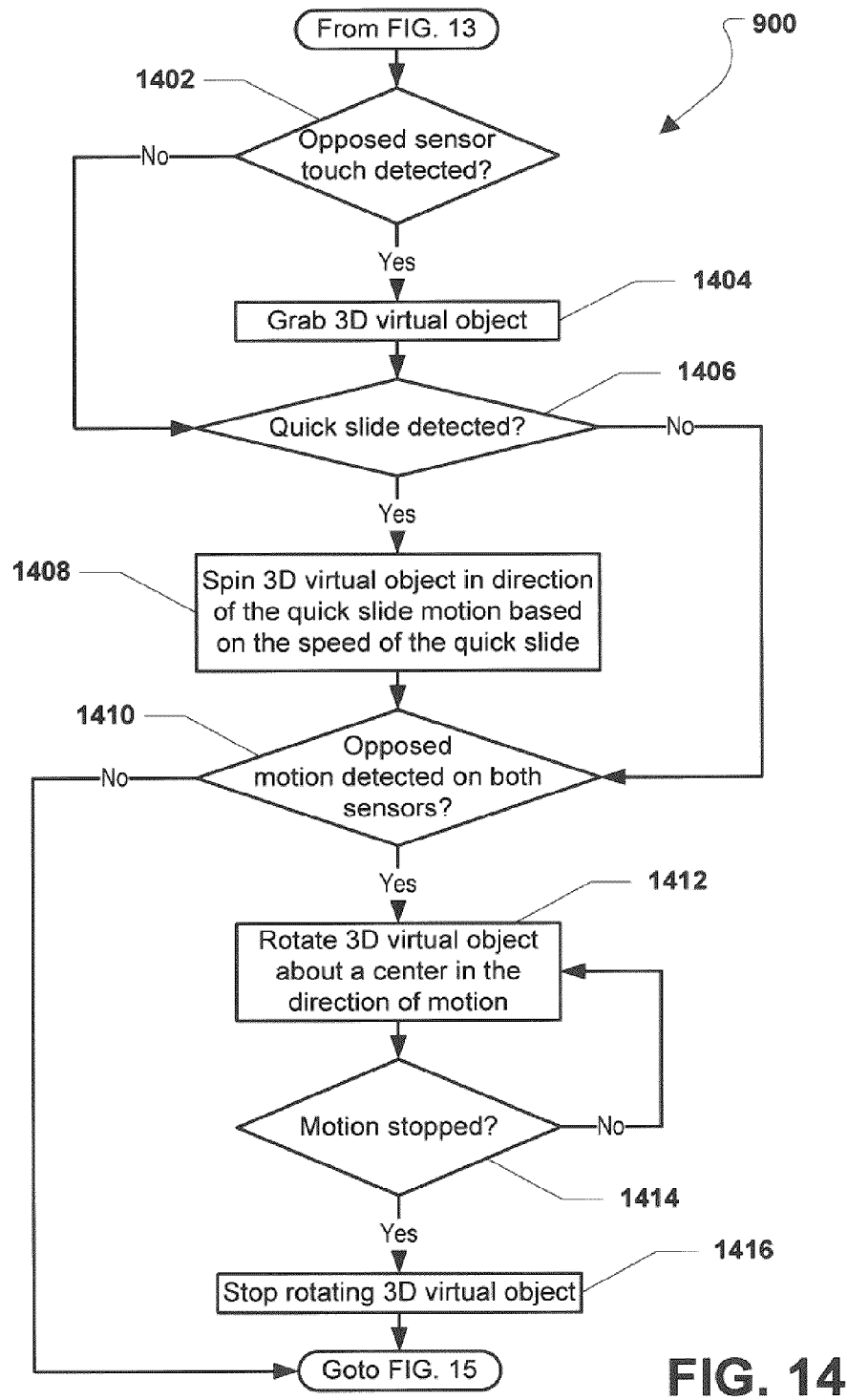
FIG. 14 is a flowchart illustrating a sixth portion of a second aspect of a method of controlling 3D virtual objects at a PCD.

At decision 1402 of FIG. 14, the 3D touch controller may determine whether an opposed sensor touch is detected. An opposed sensor touch may include a user touching a top and bottom sensor at substantially the same time, a left and a right sensor at substantially the same time, or a front and a back sensor at substantially the same time. If an opposed sensor touch is detected, the method 900 may move to block 1404 and the 3D touch controller may allow the 3D virtual object to be virtually grabbed by the user within the display. If an opposed sensor touch is not detected, the method 900 may proceed directly to decision 1616 of FIG. 16, described in detail below.

Moving to decision 1406, the 3D touch controller may determine whether a quick slide is detected on one or both of the sensors. The quick slide is similar to a flicking motion. If a quick slide is detected at decision 1406, the method 900 may move to block 1408 and the 3D virtual object may be spun around an axis that is perpendicular to a direction of the quick slide motion based on a speed of the quick slide. The axis may be front-to-back, top-to-bottom, or left-to-right. From block 1408, the method 900 may move to decision 1410. Returning to decision 1406, if a quick slide is not detected, the method 900 may proceed directly to decision 1410.

At decision 1410, the 3D touch controller may determine whether opposed motion is detected on both sensors. If so, the method 900 may move to block 1412 and the 3D virtual object may be rotated about an axis that is perpendicular to a direction of the motion. The axis may be front-to-back, top-to-bottom, or left-to-right. Next, at decision 1414, the 3D touch controller may determine whether the motion is stopped. If not, the method 900 may return to block 1412 and the 3D virtual object may continue to rotate about a central axis. If the motion is stopped, the method 900 may proceed to block 1416 and the corresponding rotation of the 3D virtual object may stop. Then, the method 900 may proceed to decision 1502 of FIG. 15. Returning to decision 1410, if opposed motion is not detected on the sensors, the method 900 may move directly to decision 1502 of FIG. 15.

Figure 15:
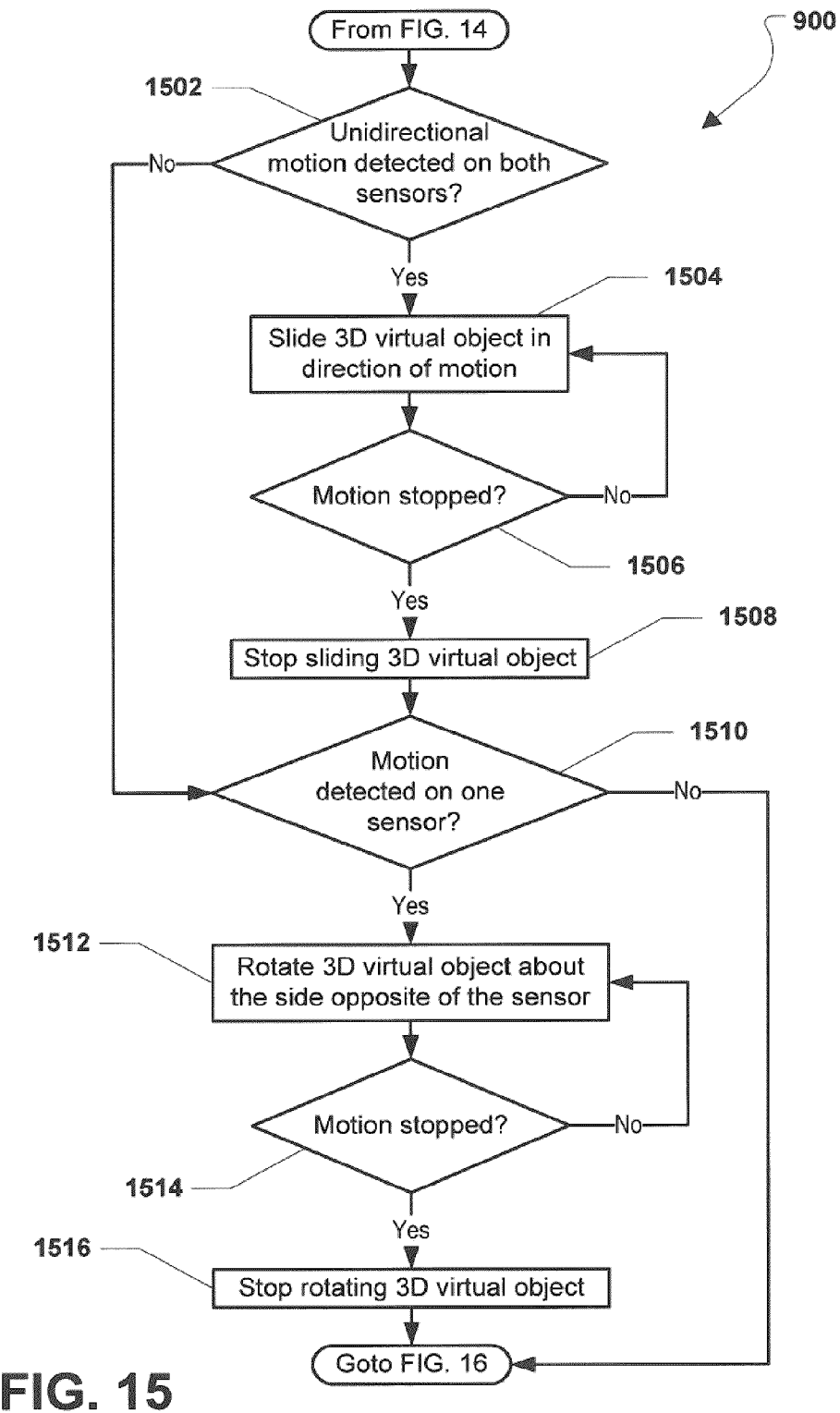
FIG. 15 is a flowchart illustrating a seventh portion of a second aspect of a method of controlling 3D virtual objects at a PCD.

Referring now to FIG. 15, at decision 1502, the 3D touch controller may determine whether unidirectional motion is detected on both sensors. If so, the method 900 may move to block 1504 and the 3D virtual object may be slid along an axis that is parallel to a direction of the motion. The axis may be front-to-back, top-to-bottom, or left-to-right. At decision 1506, the 3D touch controller may determine whether the motion is stopped. If not, the method 900 may return to block 1504 and the 3D virtual object may continue to slide along an axis. If the motion is stopped, the method 900 may proceed to block 1508 and the corresponding sliding of the 3D virtual object may stop. Thereafter, the method 900 may proceed to decision 1510. Returning to decision 1502, if unidirectional motion is not detected on the sensors, the method 900 may move directly to decision 1510.

At decision 1510, the 3D touch controller may determine whether motion is detected on one of the sensors. If so, the method 900 may move to block 1512 and the 3D virtual object may be rotated about a face, or side, of the 3D virtual object that is opposite the sensor at which motion is detected. Next, at decision 1514, the 3D touch controller may determine whether the motion is stopped. If not, the method 900 may return to block 1512 and the 3D virtual object may continue to rotate as described herein. If the motion is stopped, the method 900 may proceed to block 1516 and the corresponding rotation of the 3D virtual object may stop.

Figure 16:
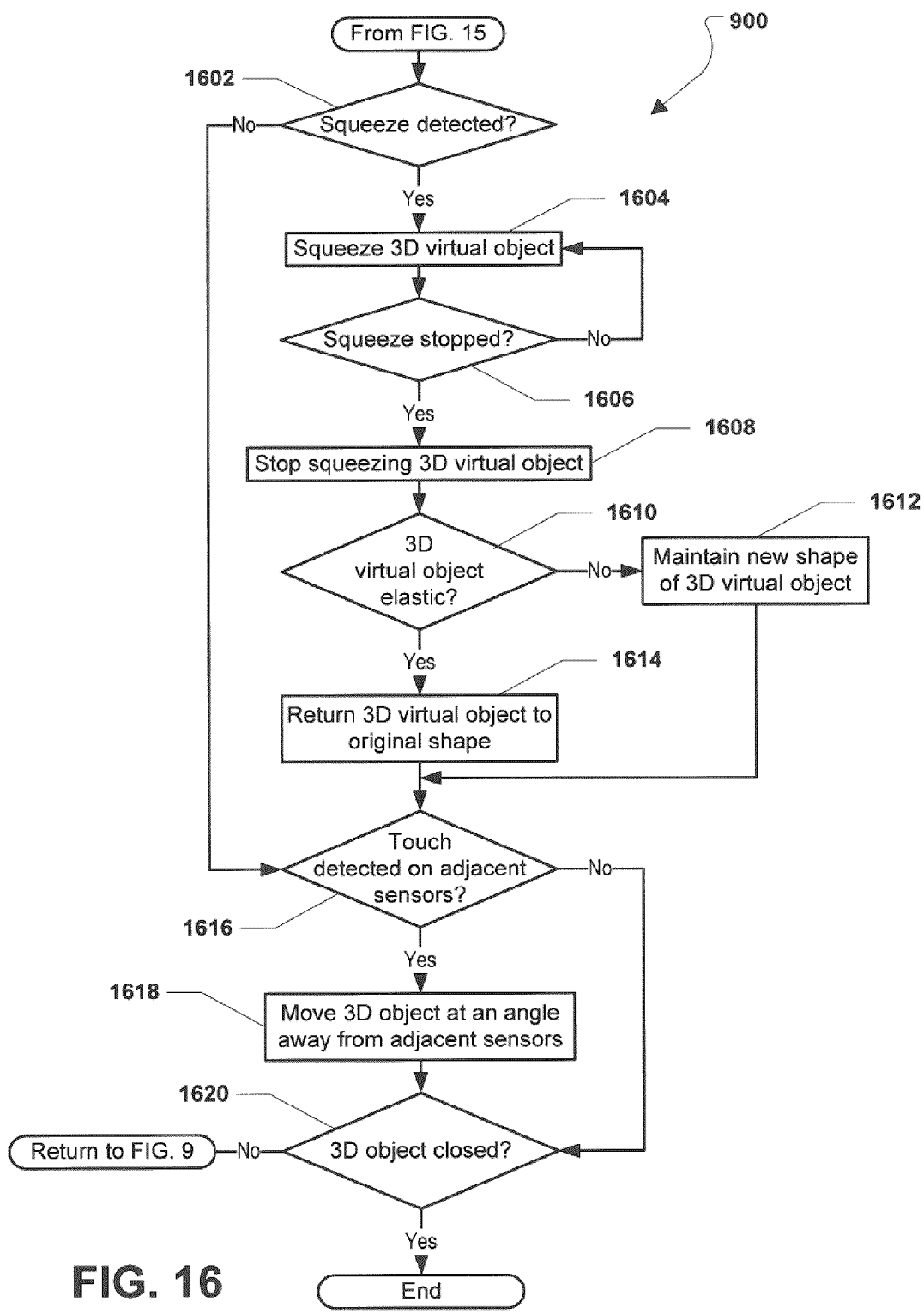
FIG. 16 is a flowchart illustrating an eighth portion of a second aspect of a method of controlling 3D virtual objects at a PCD.

Then, the method 900 may proceed to decision 1602 of FIG. 16. Returning to decision 1510, if motion is not detected on one of the sensors, the method 900 may move directly to decision 1602 of FIG. 16.

Continuing to decision 1602 of FIG. 16, the 3D touch controller may determine whether a squeeze is detected. In other words, the 3D touch controller may determine whether prolonged contact on two opposing sensors exists without motion. Alternatively, the 3D touch controller may determine whether a user is pressing the opposing sensors. If a squeeze is detected, the method 900 may move to block 1604 and the 3D virtual object may be virtually squeezed, i.e., the shape of the 3D virtual object may change as if it is being virtually squeezed between two objects.

Moving to decision 1606, the 3D touch controller may determine whether the detected squeeze has ended, i.e., the user may have released his or her fingers from both sensors. If the squeeze gesture is not ended, the method 900 may return to block 1604 and the 3D virtual object may continue to be squeezed. If the squeeze gesture is stopped, the method 900 may proceed to block 1608 and the virtual squeezing of the 3D virtual object may end or otherwise stop.

Thereafter, at decision 1610, the 3D touch controller may determine whether the 3D virtual object is elastic. The elasticity of the 3D virtual object may be determined by a user, by a software program, by a software programmer, or a combination thereof. If the 3D virtual object is not elastic, the method 900 may move to block 1612 and the new shape of the 3D virtual object may be maintained. If the 3D virtual object is elastic, the method 900 may move to block 1614 and the shape of the 3D virtual object may return to its original shape. From block 1612 and block 1614, the method 900 may continue to decision 1616.

At decision 1616, the 3D touch controller may determine whether a touch is detected on adjacent sensors, e.g., a left sensor and a top sensor, a left sensor and a bottom sensor, a left sensor and a back sensor, a left sensor and a front sensor, a right sensor and a top sensor, a right sensor and a bottom sensor, a right sensor and a back sensor, a right sensor and front sensor, or a combination thereof. If a touch is detected on adjacent sensors, the method 900 may proceed to block 1618 and the 3D virtual object may be moved at an angle away from adjacent sensors as if a user is virtually pinching the object. Next the method 900 may move to decision 1620. Returning to decision 1616, if a touch is not detected on adjacent sensors, the method 900 may move directly to decision 1620 and continue as described herein.

At decision 1620, the 3D touch controller may determine whether the 3D object is closed, i.e., whether the 3D object is no longer displayed. If not, the method 900 may return to decision 906 of FIG. 9. Otherwise, if the 3D object is closed, the method 900 may end.

Figure 17:
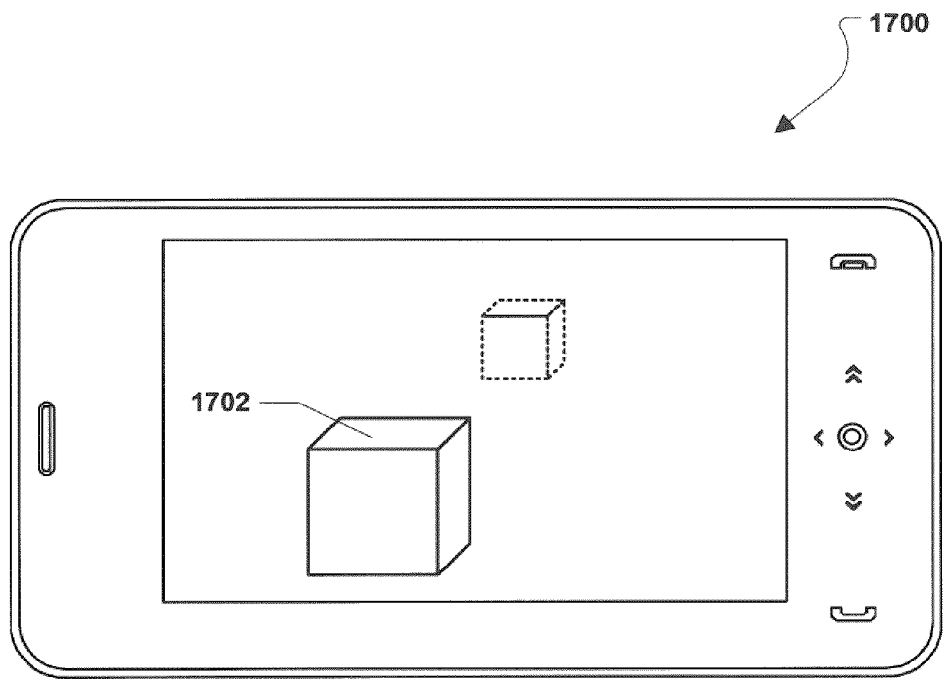
FIG. 17 is a view of a 3D virtual object moving forward on a PCD display.

FIG. 17 shows a PCD 1700 with a 3D virtual object 1702 displayed thereon. The 3D virtual object 1702 is shown in a first position, shown in dashed lines, and a second position, shown in solid lines. As shown, the 3D virtual object 1702 can be moved forward in the display due to a press on a back sensor, a bump on a back sensor, a bump on a back of the PCD 1700, a grab and slide on two sensors, or a combination thereof.

Figure 18:
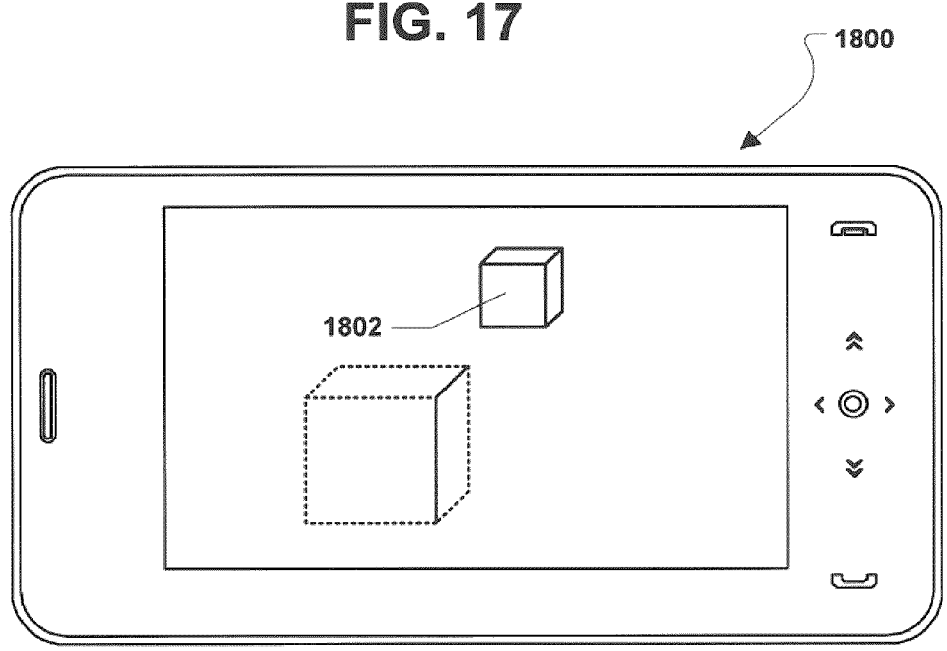
FIG. 18 is a view of a 3D virtual object moving backward on a PCD display.

FIG. 18 shows a PCD 1800 with a 3D virtual object 1802 displayed thereon. The 3D virtual object 1802 is shown in a first position, shown in dashed lines, and a second position, shown in solid lines. As shown, the 3D virtual object 1802 can be moved backward in the display due to a press on a front sensor, a bump on a front sensor, a bump on a front of the PCD 1800, a grab and slide on two sensors, or a combination thereof.

Figure 19:
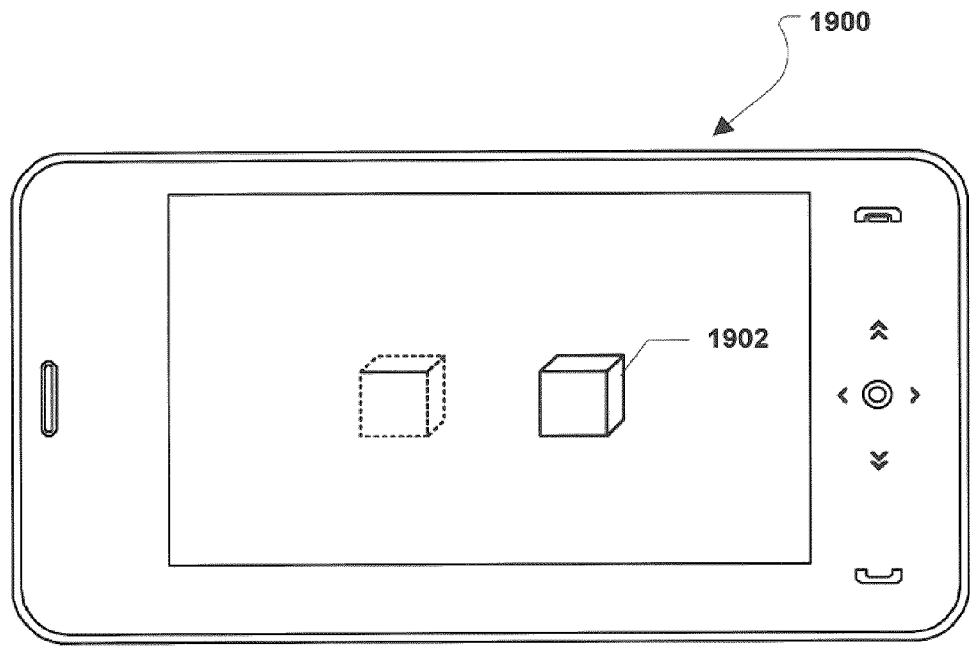
FIG. 19 is a view of a 3D virtual object moving to the left on a PCD display.

Referring to FIG. 19, a PCD 1900 is illustrated with a 3D virtual object 1902 displayed thereon. The 3D virtual object 1902 is shown in a first position, shown in dashed lines, and a second position, shown in solid lines. As shown, the 3D virtual object 1902 can be moved left-to-right in the display due to a press on a left sensor, a bump on a left sensor, a bump on a left side of the PCD 1900, a grab and slide on two sensors, or a combination thereof.

Figure 20:
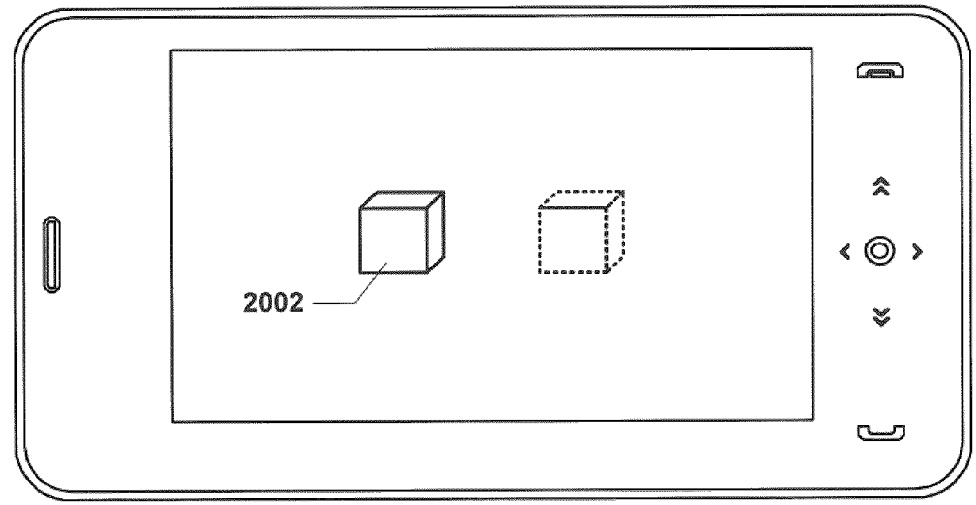
FIG. 20 is a view of a 3D virtual object moving to the right on a PCD display.

Referring to FIG. 20, a PCD 2000 is depicted with a 3D virtual object 2002 displayed thereon. The 3D virtual object 2002 is shown in a first position, shown in dashed lines, and a second position, shown in solid lines. As shown, the 3D virtual object 2002 can be moved right-to-left in the display due to a press on a right sensor, a bump on a right sensor, a bump on a right side of the PCD 2000, a grab and slide on two sensors, or a combination thereof.

Figure 21:
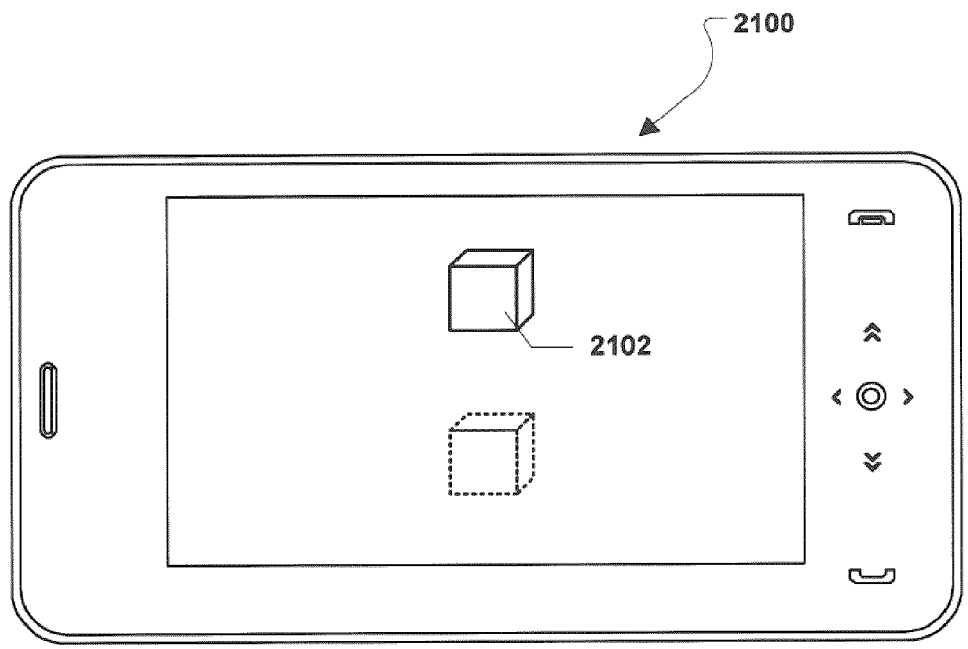
FIG. 21 is a view of a 3D virtual object moving up on a PCD display.

FIG. 21 illustrates a PCD 2100 with a 3D virtual object 2102 displayed thereon. The 3D virtual object 2102 is shown in a first position, shown in dashed lines, and a second position, shown in solid lines. As shown, the 3D virtual object 2102 can be moved up in the display due to a press on a bottom sensor, a bump on a bottom sensor, a bump on a bottom of the PCD 2100, a grab and slide on two sensors, or a combination thereof.

Figure 22:
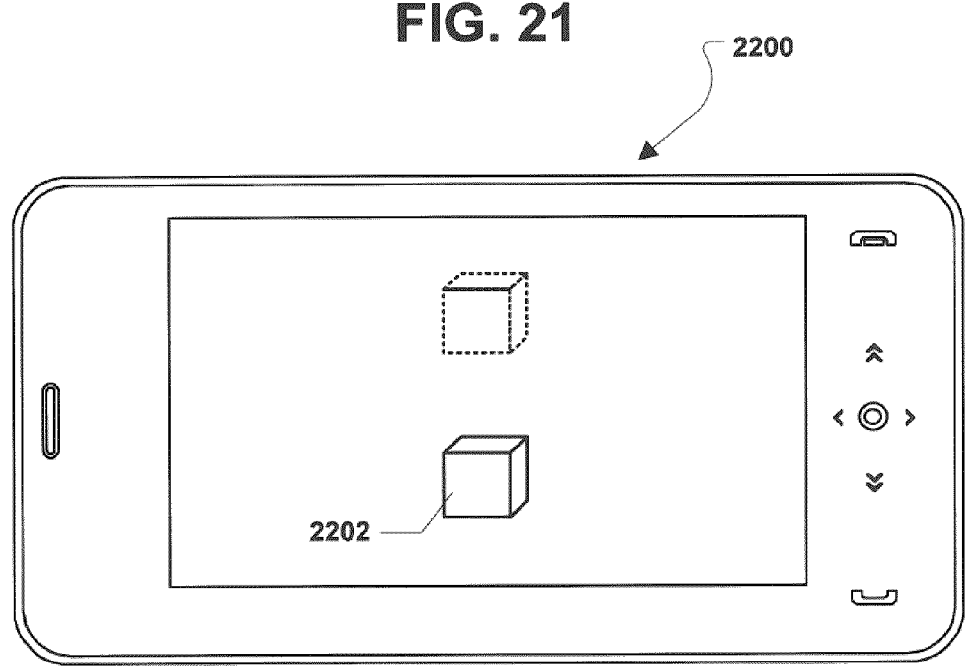
FIG. 22 is a view of a 3D virtual object moving down on a PCD display.

FIG. 22 shows a PCD 2200 with a 3D virtual object 2202 displayed thereon. The 3D virtual object 2202 is shown in a first position, shown in dashed lines, and a second position, shown in solid lines. As shown, the 3D virtual object 2202 can be moved down in the display due to a press on a top sensor, a bump on a top sensor, a bump on a top of the PCD 2200, a grab and slide on two sensors, or a combination thereof.

Figure 23:
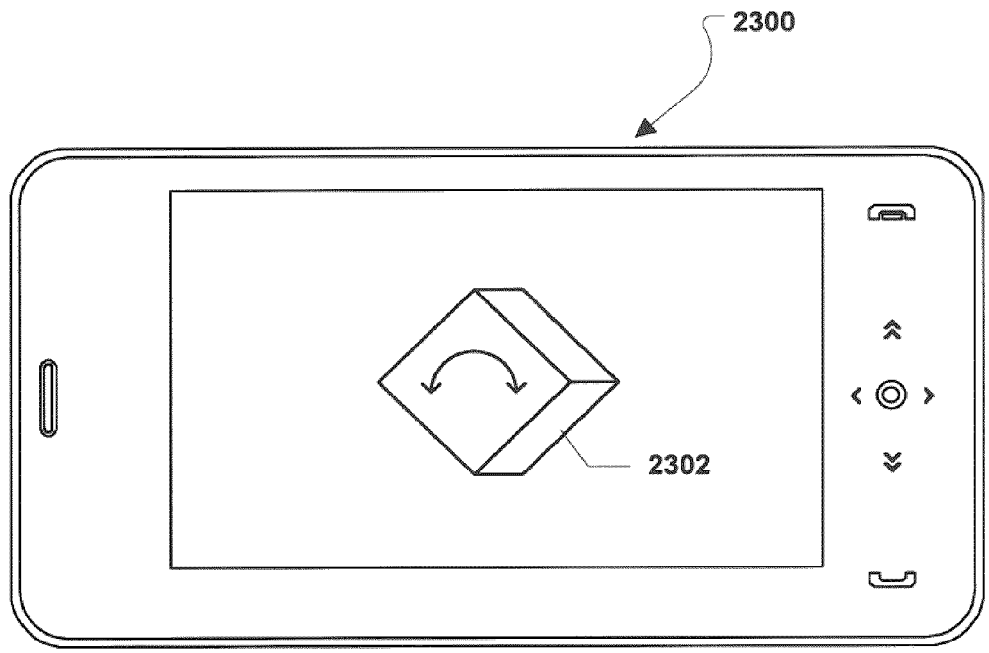
FIG. 23 is a view of a 3D virtual object rotating on a PCD display.

Referring to FIG. 23, a PCD 2300 is depicted with a 3D virtual object 2302 displayed thereon. As shown, the 3D virtual object 2302 can be rotated in the display due to a slide on one sensor, a grab and opposed slide on two sensors, or a combination thereof.

Figure 24:
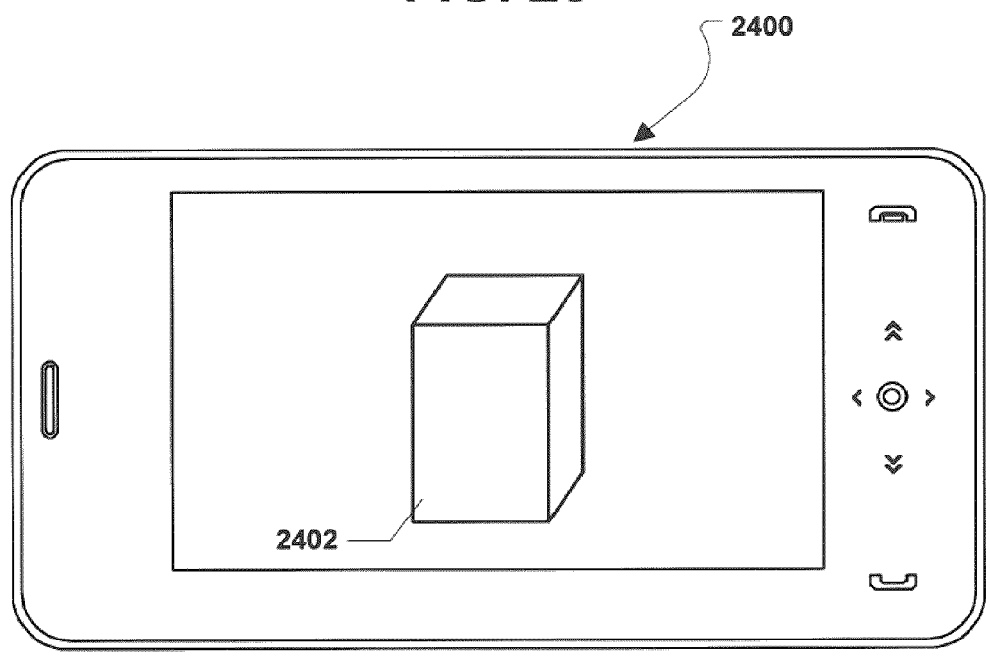
FIG. 24 is a view of a 3D virtual object being squeezed on a PCD display.

Referring now to FIG. 24, a PCD 2400 is depicted with a 3D virtual object 2402 displayed thereon. As shown, the 3D virtual object 2402 can be squeezed due to two opposite sensors being pressed and held. The 3D virtual object 2402 may retain the new shape or return to an original shape, as discussed herein.

Figure 25:
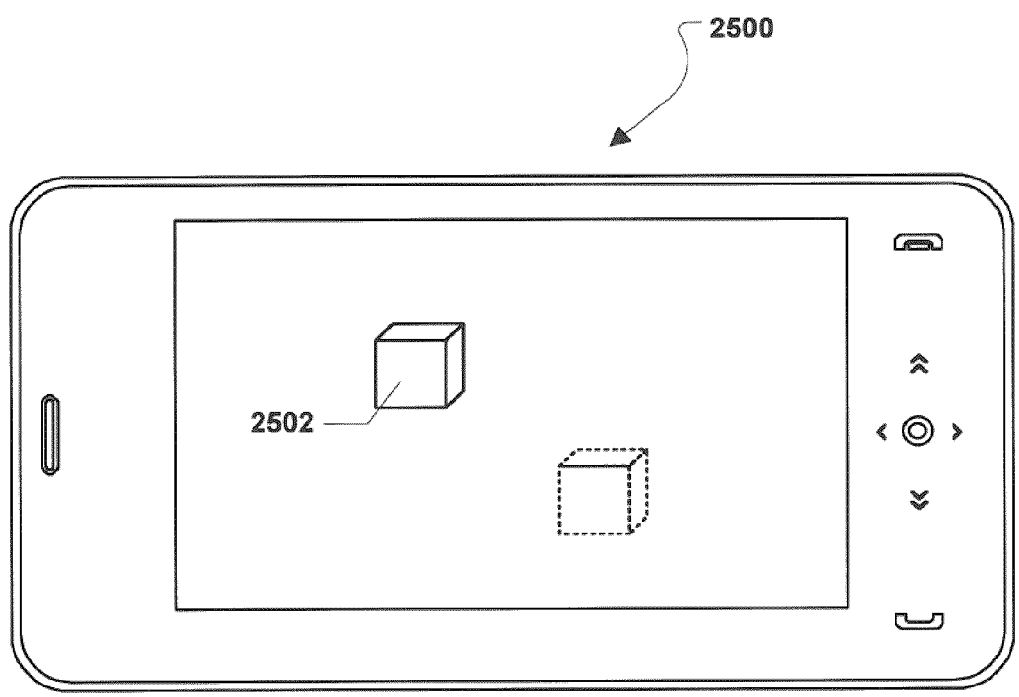
FIG. 25 is a view of a 3D virtual object moving at an angle on a PCD display.

FIG. 25 shows a PCD 2500 with a 3D virtual object 2502 displayed thereon. The 3D virtual object 2502 is shown in a first position, shown in dashed lines, and a second position, shown in solid lines. As shown, the 3D virtual object 2502 can be moved at an angle in the display in response to presses on two adjacent sensors.

It is to be understood that the method steps described herein need not necessarily be performed in the order as described. Further, words such as "thereafter," "then," "next," etc. are not intended to limit the order of the steps. These words are simply used to guide the reader through the description of the method steps.

With the configuration of structure as described herein, a user may control the movement of a 3D virtual object. A user may grab a 3D virtual object and rotate or slide the 3D virtual object. Moreover, a user can push, slide, or bump a 3D virtual object in any direction on a PCD. Controlling the 3D virtual object may be useful when playing games on a PCD, when operating other applications on a PCD, when moving or controlling 3D menu items, or a combination thereof. Further, a user may grab and stop a 3D virtual object that is already in motion. The user may utilize a grabbing gesture, e.g., by touching two opposed sensors, to grab a 3D virtual object that is in motion. The user may then stop the 3D virtual object. Also, the user may tap a sensor in order to stop a 3D virtual object that is already in motion. Alternatively, the user may tap a sensor, or sensors, in order to alter the motion of a 3D virtual object that is in motion.

In one or more exemplary aspects, the functions described may be implemented in hardware, software, firmware, or any combination thereof. If implemented in software, the functions may be stored on or transmitted over as one or more instructions or code on a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of manipulating a three-dimensional (3D) virtual object at a wireless device, the method comprising:
   displaying the 3D virtual object on a display of the wireless device;
   detecting a first type of user interaction with a pressure sensitive layer of a 3D sensor array of the wireless device;
   detecting a second type of user interaction with at least one of an accelerometer or gyroscope of the 3D sensor array, including simultaneously detecting the first type of user interaction and the second type of user interaction; and
   moving the 3D virtual object on the display of the wireless device in simultaneous response to both the first type of user interaction and the second type of user interaction, wherein the moving includes moving the 3D virtual object at least one of forward, backward, left, right, up, down, or at an angle on the display in response to the second type of user interaction while grabbing, rotating, and releasing the 3D virtual object on the display in response to the first type of user interaction;
   detecting a squeeze between each of the two opposed sensors in the 3D sensor array; and
   virtually squeezing the 3D virtual object in a direction based on the squeeze between each of the two opposed sensors in the 3D sensor array;

determining whether the 3D virtual object is elastic;
maintaining a new shape of the 3D virtual object if the 3D virtual object is not elastic; and
returning to the 3D virtual object to an original shape if the 3D virtual object is elastic.

2. The method of claim 1, wherein the second type of user interaction is a bump, the method further comprising:
moving the 3D virtual object in response to the bump, wherein the 3D virtual object is moved a distance generated based on the bump.

3. The method of claim 1, further comprising:
detecting, as the first type of user interaction, a touch on each of two opposed sensors in the 3D sensor array; and
virtually grabbing the 3D virtual object.

4. The method of claim 3, further comprising:
detecting a slide on either of the two opposed sensors in the 3D sensor array; and
spinning the 3D virtual object in a direction corresponding to a direction of the slide and at a speed based on a speed of the slide.

5. The method claim of 3, further comprising:
detecting opposed motion on each of the two opposed sensors in the 3D sensor array; and
rotating the 3D virtual object about a center of the 3D virtual object in a direction based on a direction of the opposed motion.

6. The method of claim 3, further comprising:
detecting unidirectional motion on each of the two opposed sensors in the 3D sensor array; and
sliding the 3D virtual object in a direction based on a direction of the unidirectional motion.

7. The method of claim 3, further comprising:
detecting motion on one of the two opposed sensors in the 3D sensor array; and
rotating the 3D virtual object about a side opposite the one of the two opposed sensors in a direction based on a direction of the motion.

8. A portable computing device, comprising:
a display;
a 3D sensor array; and
a processor coupled to the display and the 3D sensor array, wherein the processor is operable to:
display a 3D virtual object on the display;
detect a first type of user interaction with a pressure sensitive layer of the 3D sensor array;
detect a second type of user interaction with at least one of an accelerometer or gyroscope of the 3D sensor array, including simultaneously detect the first type of user interaction and the second type of user interaction; and
move the 3D virtual object in simultaneous response to both the first type of user interaction and the second type of user interaction, wherein the moving includes moving the 3D virtual object at least one of forward, backward, left, right, up, down, or at an angle on the display in response to the second type of user interaction while grabbing, rotating, and releasing the 3D virtual object on the display in response to the first type of user interaction;
detect a squeeze between each of the two opposed sensors in the 3D sensor array; and
virtually squeeze the 3D virtual object in a direction based on the squeeze between each of the two opposed sensors in the 3D sensor array;
determine whether the 3D virtual object is elastic;
maintain a new shape of the 3D virtual object if the 3D virtual object is not elastic; and
return to the 3D virtual object to an original shape if the 3D virtual object is elastic.

9. The device of claim 8, wherein the second type of user interaction is a bump, and the processor is further operable to:
move the 3D virtual object in response to the bump, wherein the 3D virtual object is move a distance generated based on the bump.

10. The device of claim 8, wherein the processor is further operable to:
detect, as the first type of user interaction, a touch on each of two opposed sensors in the 3D sensor array; and
virtually grab the 3D virtual object.

11. The device of claim 10, wherein the processor is further operable to:
detect a slide on either of the two opposed sensors in the 3D sensor array; and
spin the 3D virtual object in a direction corresponding to a direction of the slide and at a speed based on a speed of the slide.

12. The device of claim 10, wherein the processor is further operable to:
detect opposed motion on each of the two opposed sensors in the 3D sensor array; and
rotate the 3D virtual object about a center of the 3D virtual object in a direction based on a direction of the opposed motion.

13. The device of claim 10, wherein the processor is further operable to:
detect unidirectional motion on each of the two opposed sensors in the 3D sensor array; and
slide the 3D virtual object in a direction based on a direction of the unidirectional motion.

14. The device of claim 10, wherein the processor is further operable to:
detect motion on one of the two opposed sensors in the 3D sensor array; and
rotate the 3D virtual object about a side opposite the one of the two opposed sensors in a direction based on a direction of the motion.

15. A portable computing device, comprising:
means for displaying a 3D virtual object;
means for detecting a first type of user interaction with a pressure sensitive layer of a 3D sensor array;
means for detecting a second type of user interaction with at least one of an accelerometer or gyroscope of the 3D sensor array independently of detecting the first type of user interaction array, including means for simultaneously detecting the first type of user interaction and the second type of user interaction; and
means for moving the 3D virtual object in simultaneous response to both the first type of user interaction and the second type of user interaction, wherein the means for moving includes means for moving the 3D virtual object at least one of forward, backward, left, right, up, down, or at an angle on the display in response to the second type of user interaction while grabbing, rotating, and releasing the 3D virtual object on the display in response to the first type of user interaction;
means for detecting a squeeze between each of the two opposed sensors in the 3D sensor array; and
means for virtually squeezing the 3D virtual object in a direction based on the squeeze between each of the two opposed sensors in the 3D sensor array;
means for determining whether the 3D virtual object is elastic;

means for maintaining a new shape of the 3D virtual object if the 3D virtual object is not elastic; and means for returning to the 3D virtual object to an original shape if the 3D virtual object is elastic.

16. The device of claim 15, wherein the second type of user interaction is a bump, the device further comprising:

means for moving the 3D virtual object in response to the bump, wherein the 3D virtual object is moved a distance generated based on the bump.

17. The device of claim 15, further comprising:

means for detecting, as the first type of user interaction, a touch on each of two opposed sensors in the 3D sensor array; and means for virtually grabbing the 3D virtual object.

18. The device of claim 17, further comprising:

means for detecting a slide on either of the two opposed sensors in the 3D sensor array; and means for spinning the 3D virtual object in a direction corresponding to a direction of the slide and at a speed based on a speed of the slide.

19. The device of claim 17, further comprising:

means for detecting opposed motion on each of the two opposed sensors in the 3D sensor array; and means for rotating the 3D virtual object about a center of the 3D virtual object in a direction based on a direction of the opposed motion.

20. The device of claim 17, further comprising:

means for detecting unidirectional motion on each of the two opposed sensors in the 3D sensor array; and means for sliding the 3D virtual object in a direction based on a direction of the unidirectional motion.

21. The device of claim 17, further comprising:

means for detecting motion on one of the two opposed sensors in the 3D sensor array; and means for rotating the 3D virtual object about a side opposite the one of the two opposed sensors in a direction based on a direction of the motion.

22. A non-transitory machine readable medium, comprising:

at least one instruction for displaying a 3D virtual object;

at least one instruction for detecting a first type of user interaction with a pressure sensitive layer of a 3D sensor array;

at least one instruction for detecting a second type of user interaction with at least one of an accelerometer or gyroscope of the 3D sensor array independently of detecting the first type of user interaction array, including at least one instruction for simultaneously detecting the first type of user interaction and the second type of user interaction; and at least one instruction for moving the 3D virtual object in simultaneous response to the both the first type of user interaction and the second type of user interaction, wherein the at least one instruction for moving includes at least one instruction for moving the 3D virtual object at least one of forward, backward, left, right, up, down, or at an angle on the display in response to the second type of user interaction while grabbing, rotating, and releasing the 3D virtual object on the display in response to the first type of user interaction;

at least one instruction for detecting a squeeze between each of the two opposed sensors in the 3D sensor array; and at least one instruction for virtually squeezing the 3D virtual object in a direction based on the squeeze between each of the two opposed sensors in the 3D sensor array;

at least one instruction for determining whether the 3D virtual object is elastic;

at least one instruction for maintaining a new shape of the 3D virtual object if the 3D virtual object is not elastic; and at least one instruction for returning to the 3D virtual object to an original shape if the 3D virtual object is elastic.

23. The machine readable medium of claim 22, wherein the second type of user interaction is a bump, the machine readable medium further comprising:

at least one instruction for moving the 3D virtual object in response to the bump, wherein the 3D virtual object is moved a distance generated based on the bump.

24. The machine readable medium of claim 22, further comprising:

at least one instruction for detecting, as the first type of user interaction, a touch on each of two opposed sensors in the 3D sensor array; and at least one instruction for virtually grabbing the 3D virtual object.

25. The machine readable medium of claim 24, further comprising:

at least one instruction for detecting a slide on either of the two opposed sensors in the 3D sensor array; and at least one instruction for spinning the 3D virtual object in a direction corresponding to a direction of the slide and at a speed based on a speed of the slide.

26. The machine readable medium of claim 24, further comprising:

at least one instruction for detecting opposed motion on each of the two opposed sensors in the 3D sensor array; and at least one instruction for rotating the 3D virtual object about a center of the 3D virtual object in a direction based on a direction of the opposed motion.

27. The machine readable medium of claim 24, further comprising:

at least one instruction for detecting unidirectional motion on each of the two opposed sensors in the 3D sensor array; and at least one instruction for sliding the 3D virtual object in a direction based on a direction of the unidirectional motion.

28. The machine readable medium of claim 24, further comprising:

at least one instruction for detecting motion on one of the two opposed sensors in the 3D sensor array; and at least one instruction for rotating the 3D virtual object about a side opposite the one of the two opposed sensors in a direction based on a direction of the motion.

* * * * *